US010555239B2

(12) United States Patent
 Fukushima

(10) Patent No.: US 10,555,239 B2
(45) Date of Patent: Feb. 4, 2020

(54) SHOOTING TERMINAL, SHOOTING INSTRUCTION TERMINAL, SHOOTING SYSTEM, SHOOTING METHOD, AND NON-TRANSITORY COMPUTER-READABLE RECORDING MEDIUM STORING PROGRAM

(71) Applicant: OLYMPUS CORPORATION, Hachioji-shi, Tokyo (JP)

(72) Inventor: Keito Fukushima, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/106,563

(22) Filed: Aug. 21, 2018

(65) Prior Publication Data
 US 2018/0359677 A1   Dec. 13, 2018

Related U.S. Application Data

(63) Continuation of application No. PCT/JP2016/054990, filed on Feb. 22, 2016.

(51) Int. Cl.
 *H04L 29/06* (2006.01)
 *H04L 29/08* (2006.01)
 (Continued)

(52) U.S. Cl.
 CPC ........... *H04W 40/24* (2013.01); *H04L 67/125* (2013.01); *H04L 69/26* (2013.01);
 (Continued)

(58) Field of Classification Search
 CPC ....... H04L 41/12–26; H04L 67/12–125; H04L 69/26; H04L 69/324; H04N 5/04–28;
 (Continued)

(56) References Cited

U.S. PATENT DOCUMENTS

| 2011/0050925 A1 | 3/2011 | Watanabe |
| 2011/0141284 A1* | 6/2011 | Chen .................. H04N 5/23203 348/159 |

(Continued)

FOREIGN PATENT DOCUMENTS

| JP | 2006-238020 A | 9/2006 |
| JP | 3942600 B2 | 7/2007 |

(Continued)

OTHER PUBLICATIONS

International Search Report dated May 24, 2016, issued in counterpart International Application No. PCT/JP2016/054990, w/English translation (4 pages).

*Primary Examiner* — Timothy J Weidner
(74) *Attorney, Agent, or Firm* — Westerman, Hattori, Daniels & Adrian, LLP

(57) ABSTRACT

A shooting terminal configured to shoot in response to a shooting instruction transmitted from a shooting instruction terminal, includes a processor; and a communication device, at a first time when a specific broadcast transmission packet is received by the communication device, the processor starts a first mode in which a response to a broadcast transmission packet is not returned, controls the communication device to not to transmit packets at the data link level to the shooting instruction terminal in response to the broadcast transmission packets, starts a second mode in which a response to the broadcast transmission packet is returned at a second time after the first time, and controls the communication device to transmit a packet at the data link level to the shooting instruction terminal in response to the non-specific broadcast transmission packet.

10 Claims, 17 Drawing Sheets

(51) Int. Cl.
*H04N 5/232* (2006.01)
*H04W 4/06* (2009.01)
*H04W 4/80* (2018.01)
*H04W 40/02* (2009.01)
*H04W 40/24* (2009.01)
*H04W 56/00* (2009.01)
*H04W 76/40* (2018.01)
*H04W 84/10* (2009.01)
*H04W 84/18* (2009.01)

(52) U.S. Cl.
CPC ..... *H04N 5/23206* (2013.01); *H04N 5/23225* (2013.01); *H04W 4/06* (2013.01); *H04W 4/80* (2018.02); *H04W 40/02* (2013.01); *H04W 40/244* (2013.01); *H04W 40/246* (2013.01); *H04W 40/248* (2013.01); *H04W 56/0015* (2013.01); *H04W 76/40* (2018.02); *H04W 84/10* (2013.01); *H04W 84/18* (2013.01)

(58) Field of Classification Search
CPC ........ H04N 7/18–188; H04N 2101/00; H04W 4/06; H04W 4/80; H04W 40/02–023; H04W 40/24–32; H04W 48/02–14; H04W 56/0005–0025; H04W 76/10–40; H04W 84/005; H04W 84/10; H04W 84/18–22

See application file for complete search history.

(56) References Cited

U.S. PATENT DOCUMENTS

2017/0078554 A1* 3/2017 Suzuki ............... H04N 5/23206 348/211.2
2018/0295410 A1* 10/2018 Shinozaki ................ H04N 5/10 348/513

FOREIGN PATENT DOCUMENTS

| JP | 2011-50017 A | 3/2011 |
| JP | 2011-96449 A | 5/2011 |
| JP | 2013-109684 A | 6/2013 |
| JP | 2014-49799 A | 3/2014 |
| JP | 2015-91026 A | 5/2015 |

* cited by examiner

FIG. 6

| Flags | Service UUID | Control Command (Code) |
|---|---|---|

FIG. 7

| Flags | Service UUID | Control Command ||
|---|---|---|---|
| | | Code | Duration |

FIG. 20

| Flags | Service UUID | Control Command | | |
|---|---|---|---|---|
| | | Code | Duration | Interval |

FIG. 21

| Flags | Service UUID | Control Command | | | |
|---|---|---|---|---|---|
| | | Code | Duration | Interval | Packet No. |

SHOOTING TERMINAL, SHOOTING INSTRUCTION TERMINAL, SHOOTING SYSTEM, SHOOTING METHOD, AND NON-TRANSITORY COMPUTER-READABLE RECORDING MEDIUM STORING PROGRAM

This application is a continuation application according to a PCT International Application No. PCT/JP2016/054990, filed on Feb. 22, 2016. The content of the PCT International Application is incorporated herein by reference.

BACKGROUND OF THE INVENTION

Field of the Invention

The present invention relates, to a shooting terminal, a shooting instruction terminal, a shooting system, a shooting method, and a non-transitory computer-readable recording medium storing program.

It is known that in a digital camera system including a control device and a plurality of digital cameras, wherein connections (links) between the control device and the plurality of digital cameras are established via a communication network, the control device operates as a host to remotely and simultaneously control shooting processing of the plurality of digital cameras (see Japanese Unexamined Patent Application, First Publication No. 2006-238020).

SUMMARY OF THE INVENTION

According to a first aspect of the present invention, a shooting terminal configured to shoot in response to a shooting instruction transmitted from a shooting instruction terminal by an electromagnetic wave, includes a processor; and a communication device configured to communicate using the electromagnetic wave, wherein a specific broadcast transmission packet is defined as a broadcast transmission packet including information indicating the shooting instruction at the data link level, and a non-specific broadcast transmission packet is defined as a broadcast transmission packet without the information indicating the shooting instruction at the data link level, and wherein at a first time that is defined as the time when the specific broadcast transmission packet transmitted from the shooting instruction terminal which has not established a connection with the shooting instruction terminal at the data link level, is received by the communication device, the processor is configured to start a first mode in which a response to the broadcast transmission packet is not returned, control the communication device to not to transmit packets at the data link level to the shooting instruction terminal in response to the broadcast transmission packet received by the communication device at the first time and another broadcast transmission packet received by the communication device after the first time, start a second mode in which a response to the broadcast transmission packet is returned at a second time after the first time, and control the communication device to transmit a packet at the data link level to the shooting instruction terminal in response to the non-specific broadcast transmission packet.

According to a second aspect of the present invention, in the shooting terminal according to the first aspect, the processor may be configured to start a passive scan mode as the first mode, switch the passive scan mode to an active scan mode as the second mode, and control the communication device to transmit a scan request packet for discovering the shooting instruction terminal positioned around the shooting terminal to the shooting instruction terminal as a packet at the link data level in response to the non-specific broadcast transmission packet.

According to a third aspect of the present invention, in the shooting terminal according to the second aspect, the broadcast transmission packet may be an Advertising Packet according to the Bluetooth protocol, and the processor may be configured to control the communication device to transmit a Scan Request packet according to the Bluetooth protocol to the shooting instruction terminal as the scan request packet.

According to a fourth aspect of the present invention, in the shooting terminal according to the first aspect, the processor may be configured to control the communication device to transmit a communication connect request packet for requesting a communication connection at the data link level to the shooting instruction terminal as a packet at the data link level in response to the non-specific broadcast transmission packet.

According to a fifth aspect of the present invention, in the shooting terminal according to the fourth aspect, the broadcast transmission packet may be an Advertising Packet according to the Bluetooth protocol, and the processor may be configured to start a passive scan mode as the first mode, start a mode to perform a connect request as the second mode, and control the communication device to transmit a Connect Request packet according to the Bluetooth protocol to the shooting instruction terminal as the communication connect request packet.

According to a sixth aspect of the present invention, in the shooting terminal according to the first aspect, the processor may be configured to switch the first mode to the second mode after a predetermined period has elapsed from the first time.

According to a seventh aspect of the present invention, a shooting system, includes a shooting instruction terminal including an instruction terminal communication device and an instruction terminal processor, the instruction terminal communication device communicating using an electromagnetic wave; and a shooting terminal including a communication device and a processor, the communication device communicating using the electromagnetic wave, wherein the shooting terminal is configured to shoot in response to a shooting instruction transmitted from the shooting instruction terminal by the electromagnetic wave, wherein a specific broadcast transmission packet is defined as a broadcast transmission packet including information indicating the shooting instruction at the data link level, and a non-specific broadcast transmission packet is defined as a broadcast transmission packet without the information indicating the shooting instruction at the data link level, wherein at a first time that is defined as the time when the specific broadcast transmission packet transmitted from the shooting instruction terminal which has not established a connection with the shooting instruction terminal at the data link level, is received by the communication device, the processor is configured to start a first mode in which a response to the broadcast transmission packet is not returned, control the communication device to not to transmit packets at the data link level to the shooting instruction terminal in response to the broadcast transmission packet received by the communication device at the first time and another broadcast transmission packet received by the communication device after the first time, start a second mode in which a response to the broadcast transmission packet is returned at a second time after the first time, and control the communication device to transmit a packet at the data link level to the shooting instruction terminal in response to the non-specific broadcast transmission packet.

According to an eighth aspect of the present invention, a shooting method of a shooting terminal including a communication device configured to communicate using an electromagnetic wave and a processor, the shooting terminal configured to shoot in response to a shooting instruction transmitted from a shooting instruction terminal by the electromagnetic wave, includes defining a specific broadcast transmission packet as a broadcast transmission packet including information indicating the shooting instruction at the data link level; defining a non-specific broadcast transmission packet as a broadcast transmission packet without the information indicating the shooting instruction at the data link level; starting a first mode in which a response to the broadcast transmission packet is not returned at a first time, the first time being defined as the time when the specific broadcast transmission packet transmitted from the shooting instruction terminal which has not established a connection with the shooting instruction terminal at the data link level, is received by the communication device; controlling packets at the data link level in response to the broadcast transmission packet received by the communication device at the first time and another broadcast transmission packet received by the communication device after the first time not to be transmitted from the communication device to the shooting instruction terminal; starting a second mode in which a response to the broadcast transmission packet is returned at a second time after the first time; and controlling a packet at the data link level in response to the non-specific broadcast transmission packet to be transmitted from the communication device to the shooting instruction terminal.

According to a ninth aspect of the present invention, a non-transitory computer-readable recording medium storing program for operating a shooting terminal, the shooting terminal configured to shoot in response to a shooting instruction transmitted from a shooting instruction terminal by an electromagnetic wave, and the shooting terminal including a processor and a communication device configured to communicate using the electromagnetic wave, the program includes defining a specific broadcast transmission packet as a broadcast transmission packet including information indicating the shooting instruction at the data link level; defining a non-specific broadcast transmission packet as a broadcast transmission packet without the information indicating the shooting instruction at the data link level; causing the processor of the shooting terminal to start a first mode in which a response to the broadcast transmission packet is not returned at a first time, the first time being defined as the time when the specific broadcast transmission packet transmitted from the shooting instruction terminal which has not established a connection with the shooting instruction terminal at the data link level, is received by the communication device; control packets at the data link level in response to the broadcast transmission packet received by the communication device at the first time and another broadcast transmission packet received by the communication device after the first time not to be transmitted from the communication device to the shooting instruction terminal; start a second mode in which a response to the broadcast transmission packet is returned at a second time after the first time; and control a packet at the data link level in response to the non-specific broadcast transmission packet to be transmitted from the communication device to the shooting instruction terminal.

According to a tenth aspect of the present invention, a shooting instruction terminal configured to transmit a shooting instruction to one or more than one shooting terminals by using an electromagnetic wave, includes a communication device configured to communicate using the electromagnetic wave; a user notification unit; and a processor, wherein a broadcast transmission packet is defined as the Advertising Packet according to the Bluetooth protocol, a specific broadcast transmission packet is defined as the broadcast transmission packet including information indicating the shooting instruction at the data link level, and a non-specific broadcast transmission packet is defined as the broadcast transmission packet without the information indicating the shooting instruction at the data link level, wherein the processor is configured to control the communication device to consecutively transmit a plurality of specific broadcast transmission packets in a state in which a communication connection between the shooting instruction terminal and the shooting terminal is not established, control the communication device to transmit the non-specific broadcast transmission packet after controlling the communication device to consecutively transmit the plurality of specific broadcast transmission packets in the state in which the communication connection between the shooting instruction terminal and the shooting terminal is not established, determine that among the shooting terminals that transmit a scan request packet or a communication connect request packet received by the communication device after the specific broadcast transmission packet is transmitted by the communication device for the first time, only the shooting terminals that transmit the scan request packet or the communication connect request packet received by the communication device after the non-specific broadcast transmission packet is transmitted by the communication device are success fill in shooting in response to the shooting instruction, and notify a user at the user notification unit with at least one of information of the shooting terminals being successful in shooting in response to the shooting instruction and information of the shooting terminals failed in shooting in response to the shooting instruction according to the determination results.

BRIEF DESCRIPTION OF DRAWINGS

FIG. 6 is a schematic view showing a first example of an Advertising Data (AdvData) according to the first embodiment of the present invention.

FIG. 7 is a schematic view showing a second example of an Advertising Data (AdvData) according to the first embodiment of the present invention.

FIG. 20 is a schematic view showing an example of an Advertising Data (AdvData) according to the third embodiment of the present invention.

FIG. 21 is a schematic view showing an example of an Advertising Data (AdvData) including a packet number according to the third embodiment of the present invention.

DETAILED DESCRIPTION OF THE INVENTION

Embodiments of the present invention will be described by referring to the enclosed figures.

First Embodiment

Figure 1:
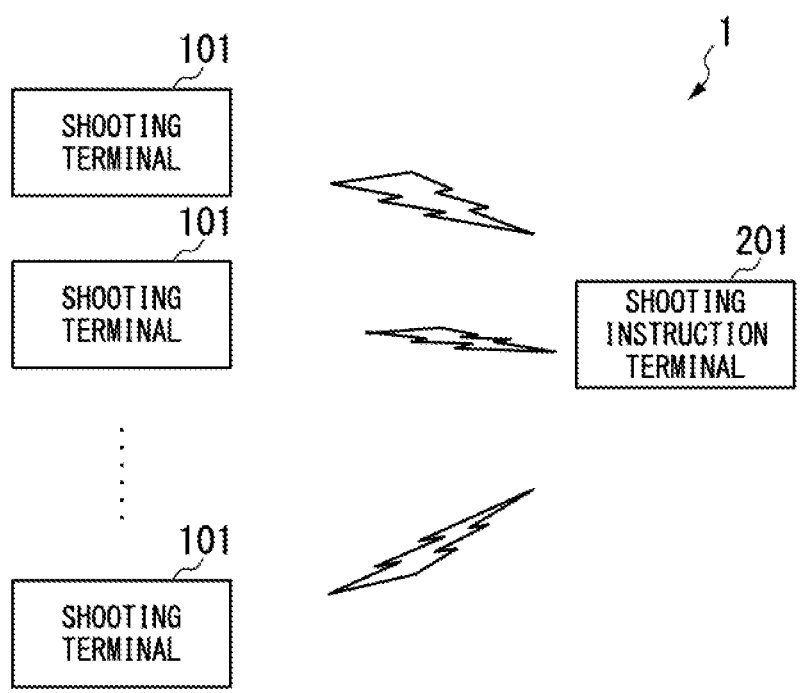
FIG. 1 is a schematic view showing a configuration of a shooting system according to a first embodiment of the present invention.

FIG. 1 is a schematic view showing a configuration of a shooting system according to the present embodiment. An example shown as a shooting system 1 including a plurality of shooting terminals 101 and a shooting instruction terminal 201 is a minimum configuration of the shooting system according to the present invention. For example, the shooting terminal 101 is an electronic device capable of capturing images such as a digital camera. For example, the shooting instruction terminal 201 is an electronic device capable of executing programs such as a smartphone or a tablet.

The shooting instruction terminal 201 is configured to simultaneously transmit shooting instructions to the plurality of shooting terminals 101. Each of the plurality of shooting terminals 101 is configured to capture an image according to the instruction from the shooting instruction terminal 201. Accordingly, the shooting instruction terminal 201 can cause the plurality of shooting terminals 101 to simultaneously capture images.

Figure 2:
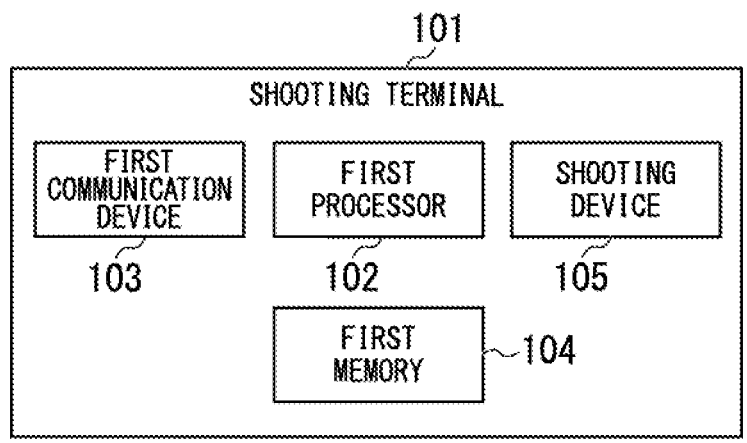
FIG. 2 is a block diagram showing a configuration of a shooting terminal according to the first embodiment of the present invention.

FIG. 2 is a block diagram showing a configuration of the shooting terminal 101 according to the present embodiment. An example shown as the shooting terminal 101 including a first processor 102, a first communication device 103, a first memory 104, and a shooting device 105 is a minimum configuration of the shooting terminal according to the present invention.

The first communication device 103 is a communication module configured to perform data communication according to the instruction from the first processor 102 according to a communication protocol such as Bluetooth (registered trademark). The first memory 104 is configured to store a control program for integrally controlling operations of the devices included in the shooting terminal 101 and data received and transmitted by the first communication device 103, and the first memory 104 is configured as a temporary storage for the image data. The first memory 104 can include various memory mediums such as a random-access memory (RAM), a flash memory, and a memory card as an external memory medium, and various data can be read out from and write to the first memory 104 for various usages.

The first processor 102 is configured to control a shooting of a subject by executing the control program stored in the first memory 104 according to the shooting instruction from the shooting instruction terminal received via the first communication device 103. The first processor 102 is also configured to integrally control the operations of the devices included in the shooting terminal 101 (for example, including a display device and an operation unit not shown).

The shooting device 105 is configured to shoot the subject to generate an image signal while perform various image processing to generate an image data according to the instruction from the first processor 102. The generated image data is stored in a memory card and the like (not shown).

Figure 3:
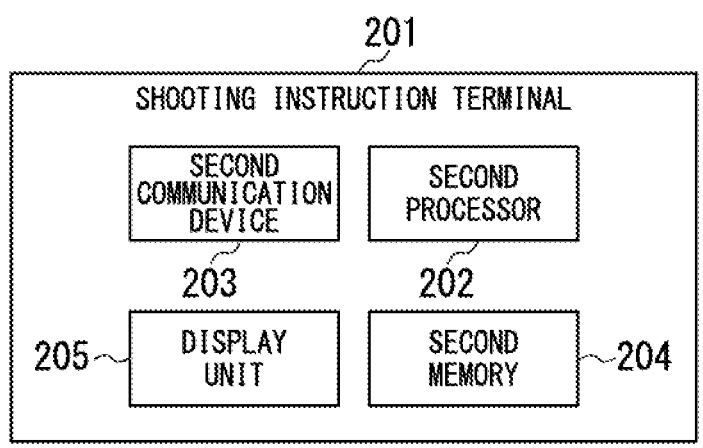
FIG. 3 is a block diagram showing a configuration of a shooting instruction terminal according to the first embodiment of the present invention.

FIG. 3 is a block diagram showing a configuration of the shooting instruction terminal 201 according to the present embodiment. An example shown as the terminal instruction terminal 201 includes a second processor 202, a second communication device 203, a second memory 204, and a display unit 205.

The second communication device 203 is a communication module configured to perform data communication according to the instruction from the second processor 202 according to a communication protocol such as Bluetooth (registered trademark). The second memory 204 is configured to store a control program for integrally controlling operations of the devices included in the shooting instruction terminal 201 and data received and transmitted by the second communication device 203. The second memory 204 can include various memory mediums such as a random-access memory (RAM), a flash memory, and a memory card as an external memory medium, and various data can be read out from and write to the second memory 204 for various usages.

The second processor 102 is configured to control a transmission of a shooting instruction input by a user from the operation unit (not shown) to the shooting terminal 101 via the second communication device 203 by executing the control program stored in the second memory 204. The second processor 202 is also configured to integrally control the operations of the devices included in the shooting instruction terminal 201 (for example, including the display unit 205 and the operation unit not shown). For example, the display unit 205 can be a liquid crystal display (LCE) configured to display the images.

Figure 4:
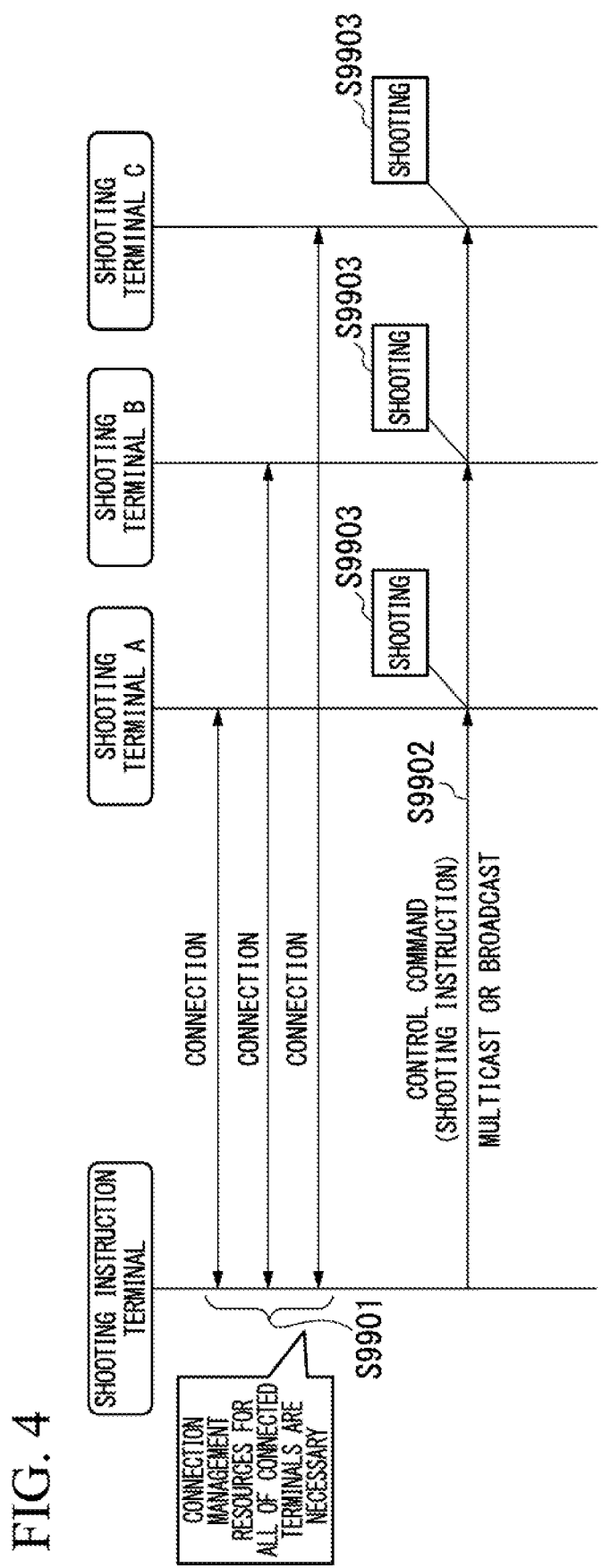
FIG. 4 is a sequence diagram showing a procedure of transmitting a shooting instruction from a shooting instruction terminal to a shooting terminal according to a known technology in the art.

Next, an example of transmitting the shooting instruction from the shooting instruction terminal to the shooting terminal will be described. FIG. 4 is a sequence diagram showing a procedure of transmitting a shooting instruction from a shooting instruction terminal to a shooting terminal according to a known technology in the art.

(Step S9901) The shooting instruction terminal establishes communication connections with each of shooting terminals A-C. In a general situation of transmitting and receiving data between terminals, it is necessary to establish a connection between the terminals (herein, the connection refers to a connection according to a wireless communication such as a wireless LAN or Bluetooth and the like). Furthermore, a resource (memory) of connection management is necessary for establishing the connection with each terminal, and it is possible that the connection cannot be established if the resource is insufficient due to an increase of the shooting terminals.

(Step S9902) The shooting instruction terminal performs multiple addressing simultaneous transmission (multicast or broadcast) of control commands (shooting instructions) to the shooting terminals A-C. In the example shown in the figure, the control commands (shooting instructions) are delivered to all of the shooting terminals A-C.

(Step S9903) The control commands (shooting instructions) are delivered to the shooting terminals A-C such that the shooting terminals A-C shoot according to the control commands (shooting instructions).

Figure 5:
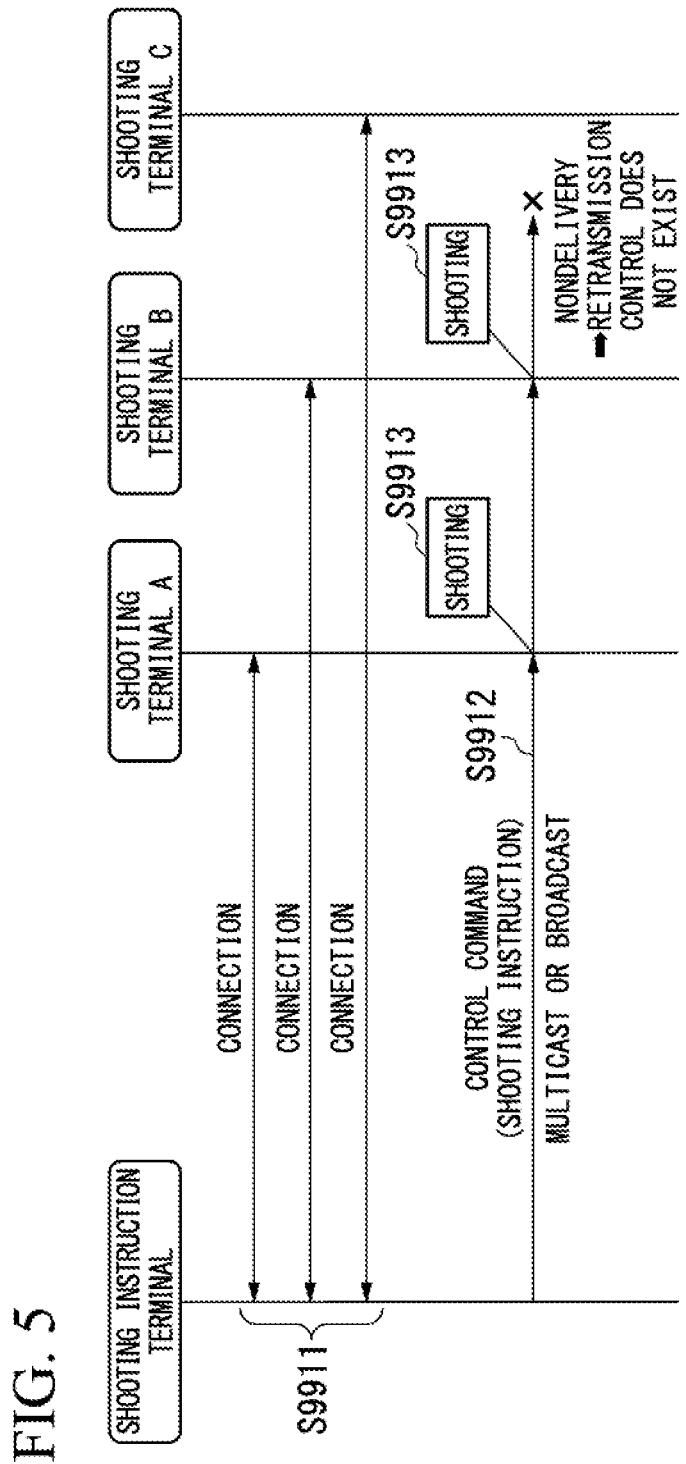
FIG. 5 is a sequence diagram showing a procedure of transmitting a shooting instruction from a shooting instruction terminal to a shooting terminal according to a known technology in the art.

Due to communication error, it is possible that the control commands (shooting instructions) are not delivered from the shooting instruction terminal to the shooting terminals A-C. FIG. 5 is a sequence diagram showing a procedure of transmitting a shooting instruction from a shooting instruction terminal to a shooting terminal according to a known technology in the art. Step S9911 is the same with the step S9901.

(Step S9912) The shooting instruction terminal performs multiple addressing simultaneous transmission (multicast or broadcast) of control commands (shooting instructions) to the shooting terminals A-C. In the example shown in the figure, the control commands (shooting instructions) are delivered to the shooting terminals A and B, however, the control command (shooting instruction) is not delivered to the shooting terminal C.

(Step S9913) The shooting terminals A and B shoot according to the control commands (shooting instructions) since the control commands (shooting instructions) are delivered. On the other hand, the shooting terminal C does not shoot since the control command (shooting instruction) is not delivered.

As described above, according to the known method, in a situation of simultaneously transmitting control commands (shooting instructions) to multiple shooting terminals, the transmission is performed by using the multiple addressing simultaneous transmission (multicast or broadcast). However, the multiple addressing simultaneous transmission does not include a retransmission control such that in a situation when the control command (shooting instruction) is not delivered to the shooting terminal, the shooting terminal cannot shoot.

In the present embodiment, the shooting instruction terminal 201 repeatedly transmits the shooting instruction to the shooting terminal 101 for a period. Next, the communication method according to the present embodiment will be described. According to the Bluetooth protocol, the shooting terminal 101 functions as Central and the shooting instruction terminal 201 functions as Peripheral. An Advertising Packet according to the Bluetooth protocol is used as a multiple addressing simultaneous transmission packet on data link level. The Advertising Packet is transmitted from the Peripheral to the Central using the multiple addressing simultaneous transmission before connections between the terminals are established. According to the present embodiment, the shooting instruction terminal 201 instructs the shooting terminal 101 by adding the control command (shooting instruction) on the Advertising Packet. Such a multiple addressing simultaneous transmission packet including a control command (for example, information indicating shooting instruction) on the data link level is defined as a specified multiple addressing simultaneous transmission packet. A multiple addressing simultaneous transmission packet without the control command on the data link level is defined as a non-specified multiple addressing simultaneous transmission packet.

Next, Advertising Data (AdvData) of the Advertising Packet will be described. FIG. 6 is a schematic view showing a first example of the Advertising Data (AdvData) according to the present embodiment. According to the example shown, the Advertising Data (AdvData) includes "Flags", "Service UUID", and "Control Command (Code)".

"Flags" refers to the data type Flags defined in the Bluetooth specification in which mode information of device search (discovery) is included. "Service UUID" refers to a unique ID defined in the Bluetooth specification used for recognizing Service, and in the present embodiment, "Service UUID" is the unique ID for identifying simultaneous shooting service. "Control Command (Code)" refers to the control commands according to the present embodiment and includes commands indicating "shooting", "start video shooting", "stop video shooting", and the like.

In the situation of multiple addressing simultaneous transmission, it is impossible to confirm whether the control command (shooting instruction) is delivered to the shooting terminal 101. Accordingly, in the present embodiment, in consideration of the situation that the control command (shooting instruction) is undelivered, when the shooting instruction terminal 201 transmits the shooting instruction once, the shooting instruction terminal 201 repeatedly transmits the Advertising Packet being added with the control command during a first repetition period. Accordingly, the probability of delivering the control command (shooting instruction) to the shooting terminal 101 is increased.

When the shooting instruction terminal 201 transmits the shooting instruction once, the shooting instruction terminal 201 repeatedly transmits the Advertising Packet being added with the control command during the first repetition period. Accordingly, it is necessary to cause the shooting terminal 101 not to repeatedly shoot even if the shooting terminal 101 repeatedly receives the Advertising Packet. In the present embodiment, after the shooting terminal 101 receives the Advertising Packet, the shooting terminal 101 will ignore the control command during the first repetition time even if the shooting terminal 101 continues to receive the Advertising Packet. Thus, it is possible to prevent the shooting terminal 101 from repeatedly executing the control commands that are repeatedly delivered.

The first repetition period can be a predetermined value, however, in some cases, since the probability that the Advertising Packet is undelivered may become high due to the environment, the value of the first repetition period can be changed to any value for optimally corresponding to different environment. For example, in a case that the wireless communication environment is bad, it is possible to decrease the probability that the Advertising Packet is undelivered by extending the first repetition period.

In this situation, the shooting instruction terminal 201 sets a control command and an arbitrary first repetition period as the parameters of the Advertising Packet and transmits the Advertising Packet by multiple addressing simultaneous transmission. Accordingly, even if the shooting instruction terminal 201 changes the first repetition period arbitrarily, the shooting terminal 101 can grasp the changed first repetition period by referring to the arbitrary first repetition period set to the Advertising Packet.

FIG. 7 is a schematic view showing a second example of the Advertising Data (AdvData) according to the present embodiment. According to the example shown, the Advertising Data (AdvData) includes "Flags", "Service UUID", and "Control Command (Code)".

The "Flags" and "Service UUID" are the same as the example shown in FIG. 6. The "Control Command" includes "Code" and "Duration". The "Code" is the same as the "Control Command (Code)" shown in FIG. 6. The "Duration" indicates a first repetition period of the Advertising Packet.

The shooting terminal 101 that has finished the shooting may display that on a display device (for example, a display panel or an indicator) of the shooting terminal 101 or light on the display device in order to inform the operator that the shooting has finished. The shooting instruction terminal 201 may perform a delivery confirmation after the control command has been transmitted (after the first repetition period). Accordingly, the shooting instruction terminal 201 can achieve goals of preventing congestion during the transmission of the control command and confirming the shooting terminal 101 that has finished the shooting.

Figure 8:
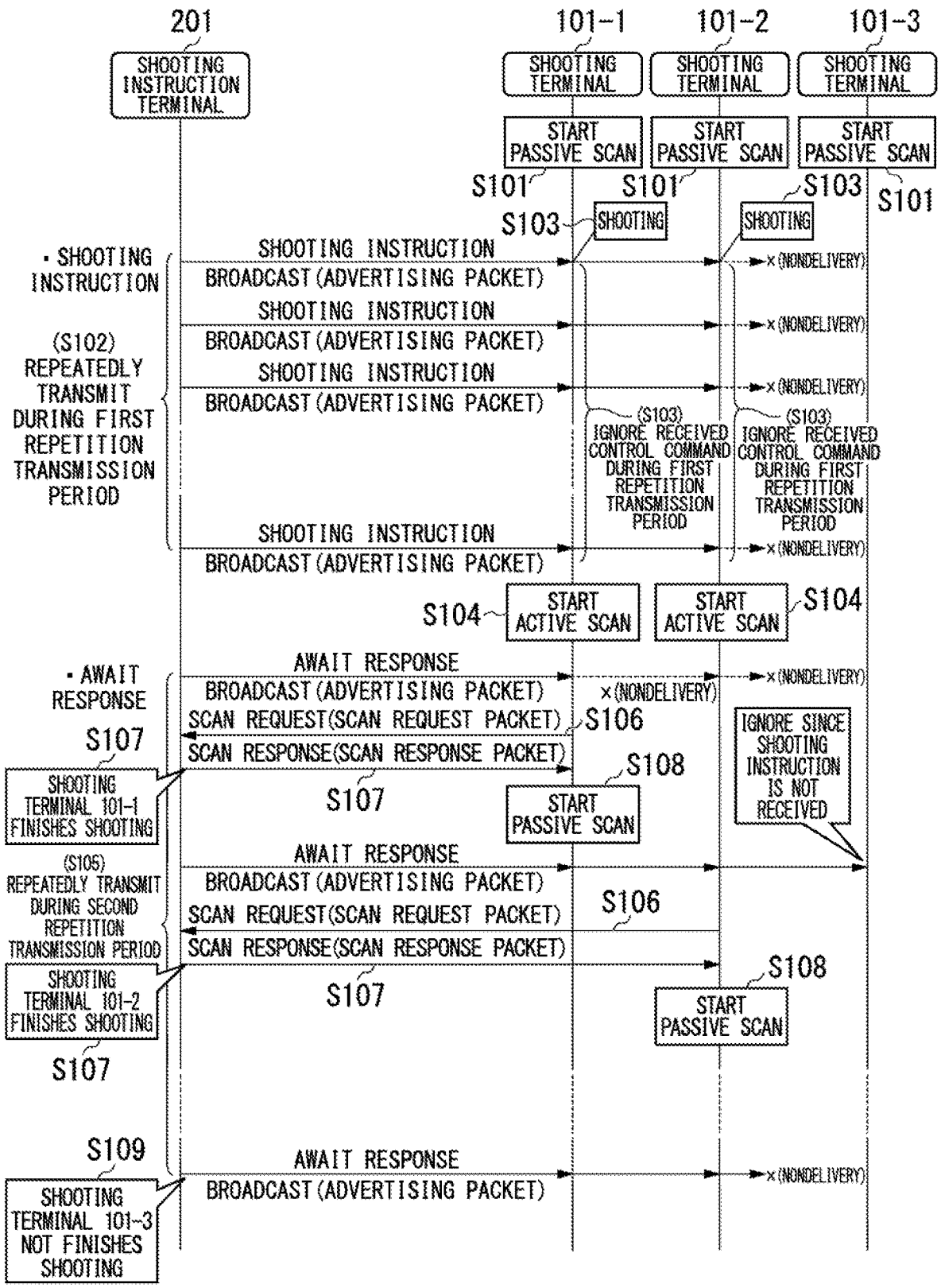
FIG. 8 is a sequence diagram showing a procedure of transmitting a shooting instruction from the shooting instruction terminal to the shooting terminal and confirming the delivery of the shooting instruction according to the first embodiment of the present invention.

Next, an example of the shooting instruction terminal 201 transmitting the shooting instruction to the shooting terminal 101 and performing the delivery confirmation will be described. FIG. 8 is a sequence diagram showing the procedures of the shooting instruction terminal 201 transmitting the shooting instruction to the shooting terminal 101 and performing the delivery confirmation of the shooting instruction.

(Step S101) The shooting terminals 101-1 to 101-3 begin passive scan. The passive scan is a scan method of receiving the Advertising Packet only and not returning a response to the Advertising Packet.

(Step S102) The shooting instruction terminal 201 repeats to transmit the Advertising Packet of the shooting instruction during the first repetition period. The shooting instruction terminal 201 finishes transmitting the Advertising Packet of the shooting instruction after the first repetition period has finished.

(Step S103) The shooting terminals 101-1 and 101-2 receive the Advertising Packet of the shooting instruction and thus perform shooting processing at the time when the Advertising Packet of the shooting instruction has been received. The shooting terminals 101-1 and 101-2 ignore the control command during the first repetition period after receiving the Advertising Packet of the shooting instruction. On the other hand, the Advertising Packet of the shooting instruction is not delivered to the shooting terminal 101-3 in the example shown. Accordingly, the shooting terminal 101-3 does not receive the Advertising Packet of the shooting instruction and does not perform any processing.

(Step S104) Since the period during the first repetition period after the shooting terminals 101-1 and 101-2 receive the Advertising Packet of the shooting instruction has elapsed, the shooting terminal 101-1 and 101-2 start active scan. The active scan is a scan method of returning a response (Scan Request) once the Advertising Packet has been received. The shooting terminal 101-3 does not receive the Advertising Packet of the shooting instruction and does not perform any processing.

(Step S105) In order to perform the delivery confirmation after the first repetition period, the shooting instruction terminal 201 repeats to perform the multiple addressing simultaneous transmission of the Advertising Packet of the awaiting response during a second repetition period. The shooting instruction terminal 201 finishes repeatedly transmitting the Advertising Packet of the awaiting response after the second repetition period.

(Step S106) The shooting terminals 101-1 and 101-2 are performing the active scan. Accordingly, when the shooting terminals 101-1 and 101-2 receive the Advertising Packet of the awaiting response, the shooting terminals 101-1 and 101-2 transmit the Scan Request packet of the scan request. On the other hand, the shooting terminal 101-3 is performing the passive scan. Accordingly, even if the shooting terminal 101-3 receives the Advertising Packet of the awaiting response, the shooting terminal 101-3 does not perform any processing. In the example shown, the shooting terminal 101-1 receives the Advertising Packet of the awaiting response that is transmitted for the first time. The shooting terminal 101-2 receives the Advertising Packet of the awaiting response that is transmitted for the second time.

(Step S107) In a case when the shooting instruction terminal 201 receives the Scan Request packet of the scan request, the shooting instruction terminal 201 determines that the corresponding shooting terminal 101 transmitting the Scan Request packet has finished the shooting. In the example shown, the shooting terminal 201 determines that the shooting terminals 101-1 and 101-2 have finished the shooting. Also, in the case when the shooting instruction terminal 201 receives the Scan Request packet of the scan request, the shooting instruction terminal 201 transmits a Scan Response packet of scan response to the corresponding shooting terminal 101 transmitting the Scan Request packet. In the example shown, the shooting instruction terminal 201 transmits the Scan Response packet to the shooting terminals 101-1 and 101-2.

(Step S108) In a case when the shooting terminals 101-1 and 101-2 receive the Scan Response packet of the scan response, the shooting terminals 101-1 and 101-2 start the passive scan. Accordingly, even if the Advertising Packet of the awaiting response is received multiple times, it is possible to ignore the Advertising Packet of the awaiting response that is received for the second time and subsequent times.

(Step S109) At the time when the shooting instruction terminal 201 finishes repeatedly transmitting the Advertising Packet of the awaiting response, the shooting instruction terminal 201 determines that the shooting by the corresponding shooting terminal 101 that does not receive the Scan Request packet of scan request is not finished. In the example shown, the shooting instruction terminal 201 determines that shooting by the shooting terminal 101-3 is not finished.

Figure 9:
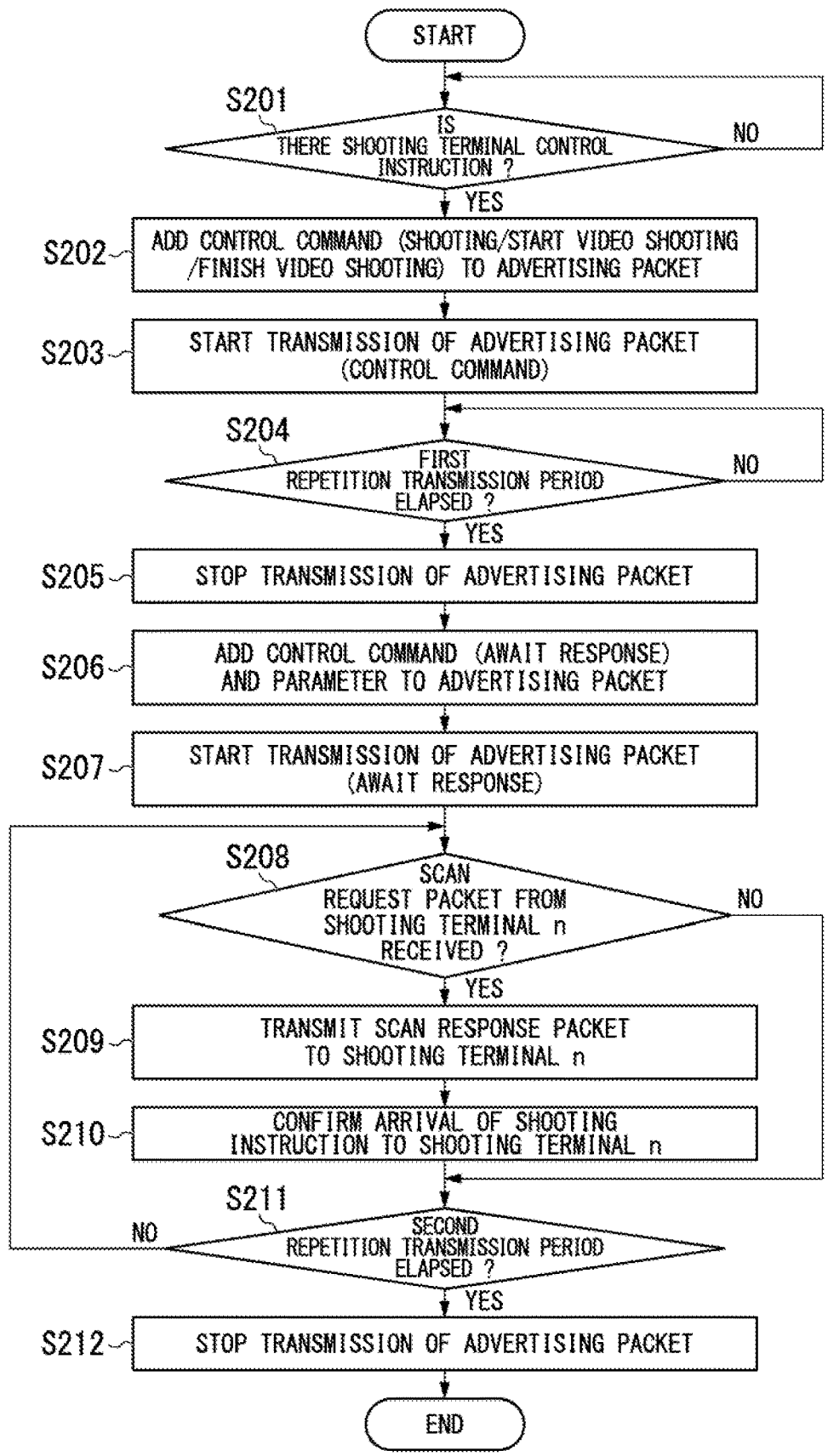
FIG. 9 is a flowchart showing an operation procedure of the shooting instruction terminal according to the first embodiment of the present invention.

Next, operations of the shooting instruction terminal 201 will be described. FIG. 9 is a flowchart showing the operation procedures of the shooting instruction terminal 201 according to the present embodiment.

(Step S201) The second processor 202 of the shooting instruction terminal 201 is configured to determine whether a shooting terminal control instruction is input. In a case when it is determined that the shooting terminal control instruction is input, the second processor 202 of the shooting instruction terminal 201 proceeds to the processing of the Step S202. In a case when it is determined that the shooting terminal control instruction is not input, the Step S201 will be executed again.

(Step S202) The second processor 202 sets the shooting instruction control command and the parameters to the Advertising Packet according to the shooting terminal control instruction input during the Step S201. Then, the second processor 202 proceeds to the processing of the Step S203. A shooting instruction, a start video shooting instruction, a finish video shooting instruction and the like are used as the shooting instruction control command.

(Step S203) The second processor 202 controls the second communication device 203 to repeatedly transmit the Advertising Packet processed during the Step S202. Then, the second processor 202 proceeds to the processing of the Step S204.

(Step S204) The second processor 202 determines whether the first repetition period has elapsed. In a case when it is determined that the first repetition period has elapsed, the second processor 202 proceeds to the processing of the Step S205. In a case when it is determined that the first repetition period has not elapsed, the processing of the Step S204 will be executed again. Although it is not shown, before the first repetition period has elapsed, when the second communication device 203 receives the Scan Request packet from another terminal including the shooting terminal, the second processor 202 instructs the second communication device 203 to transmit the Scan Response packet to the other terminal that is the transmission source of the Scan Request packet, and the second processor 202 processes the Step S204 again while the second processor 202 does not determine that the other terminal has received the shooting instruction control command. Furthermore, before the first repetition period has elapsed, when the second communication device 203 receives the Connect Request packet from another terminal including the shooting terminal and has established a connection with the other terminal, the second processor 202 instructs the second communication device 203 to disconnect from the other terminal, and the second processor 202 processes the Step S204 again while the second processor 202 does not determine that the other terminal has received the shooting instruction control command.

(Step S205) The second processor 202 instructs the second communication device 203 to stop the repetition transmission of the Advertising Packet. Then, the second processor 202 proceeds to the processing of the Step S206.

(Step S206) The second processor 202 sets the control command awaiting response and the parameters to the Advertising Packet. Then, the second processor 202 proceeds to the processing of the Step S207.

(Step S207) The second processor 202 instructs the second communication device 203 to repeatedly transmit the Advertising Packet that is processed during the Step S206. Then, the processor proceeds to the processing of the Step S208.

(Step S208) The second processor 202 determines whether the second communication device 203 has received the Scan Request packet from the shooting terminal 101-*n*. When the second processor 202 determines that the second communication device 203 has received the Scan Request packet from the shooting terminal 101-*n*, the second processor 202 proceeds to the processing of the Step S209, and when the second processor 202 determines that the second communication device 203 has not received the Scan Request packet from the shooting terminal 101-*n*, the second processor 202 proceeds to the processing of the Step S211.

(Step S209) The second processor 202 instructs the second communication device 203 to transmit the Scan Response packet to the shooting terminal 101-*n* that is the transmission source of the Scan Request packet. Then, the second processor 202 proceeds to the processing of the Step S201.

(Step S210) The second processor 202 determines that the shooting terminal 101-*n* has received the shooting instruction control command (confirms the delivery of the shooting instruction to the shooting terminal 101-*n*). Then, the second processor 202 proceeds to the processing of the Step S211.

(Step S211) The second processor 202 determines whether the second repetition period has elapsed. When the second processor 202 determines that the second repetition period has elapsed, the second processor 202 proceeds to the processing of the Step S212, and when the second processor 202 determines that the second repetition period has not elapsed, the second processor 202 returns to the processing of the Step S208.

(Step S212) The second processor 202 instructs the second communication device 203 to stop the repetition transmission of the Advertising Packet. Then, the second processor 202 finished the processing.

During the processing described above, the second processor 202 of the shooting instruction terminal 201 is configured that once the second processor 202 instructs the second communication device 203 to start the transmission of the Advertising Packet, a processor (not shown) disposed inside the second communication device 203 repeatedly transmits the Advertising Packet until the processor is instructed to stop the transmission of the Advertising Packet. However, the second processor 202 may be configured to instruct the transmission instruction of each Advertising Packet with respect to the second communication device 203 every time during the repetition transmission period.

Figure 10:
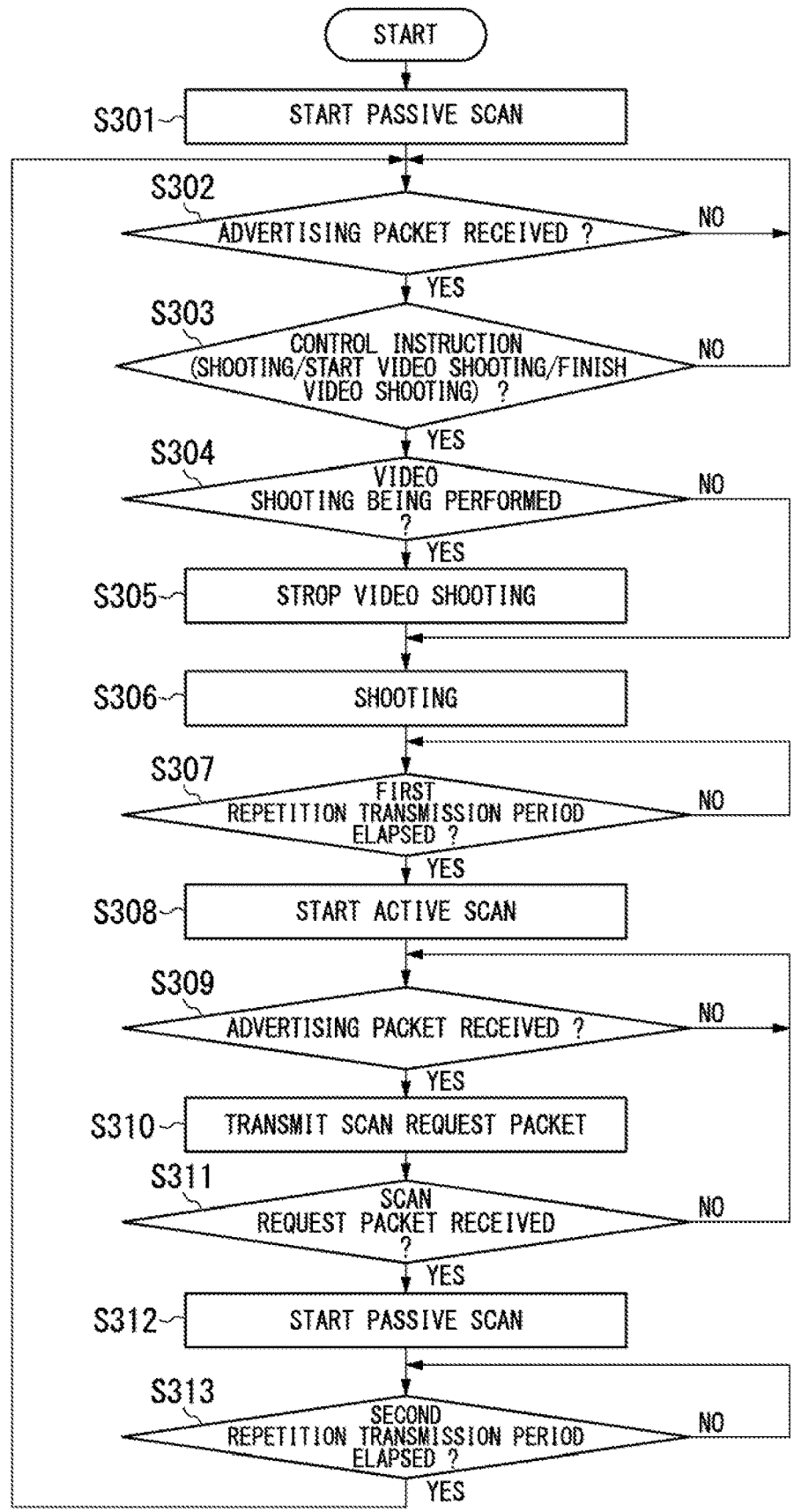
FIG. 10 is a flowchart showing an operation procedure of the shooting terminal according to the first embodiment of the present invention.

Next, operations of the shooting terminal 101 will be described. FIG. 10 is a flowchart showing the operation procedures of the shooting terminal 101.

(Step S301) The first processor 102 of the shooting terminal 101 starts the passive scan. Then, the processor 102 proceeds to the processing of the Step S302.

(Step S302) The first processor 102 determines whether the first communication device 103 receives the Advertising Packet from the shooting instruction terminal 201. When the first processor 102 determines that the first communication device 103 receives the Advertising Packet, the first processor 102 proceeds to the processing of the Step S303, and when the first processor 102 determines that the first communication device 103 does not receive the Advertising Packet, the first processor 102 executes the Step S302 again.

(Step S303) The first processor 102 acquires the Service UUID and the control command included in the Advertising Packet that is received during the Step S302. The acquired Service UUID is an ID indicating a simultaneous shooting control service. When the control command is "shooting" or "start video shooting" or "stop video shooting", the first processor 102 proceeds to the processing of the Step S304, otherwise the first processor 102 returns to the Step S302.

(Step S304) The first processor 102 determines whether the video shooting is performed. When the first processor 102 determines that the video shooting is performed, the first processor 102 proceeds to the processing of the Step S305, and when the first processor 102 determines that the video shooting is not performed, the first processor 102 proceeds to the processing of the Step S306.

(Step S305) The first processor 102 stops the video shooting. Then, the first processor 102 proceeds to the processing of the Step S306.

(Step S306) The first processor 102 performs the shooting control according to the control instruction acquired in the Step S303. Then, the first processor 102 proceeds to the processing of the Step S307. For example, when the control command acquired in the Step S303 is the "shooting instruction", the first processor 102 instructs the shooting device 105 to shoot a still image. For example, when the control command acquired in the Step S303 is the "start video shooting", the first processor 102 instructs the shooting device 105 to shoot a video. For example, when the control command acquired in the Step S303 is the "stop video shooting", the first processor 102 instructs the shooting device 105 to finish shooting the video.

(Step S307) The first processor 102 determines whether the first repetition period has elapsed from the reception of the Advertising Packet during the processing of the Step S302. When the first processor 102 determines that the first repetition period has elapsed from the reception of the Advertising Packet during the processing of the Step S302, the processor 102 proceeds to the processing of the Step S308, and when the first processor 102 determines that the first repetition period has not elapsed from the reception of the Advertising Packet during the processing of the Step S302, the processor 102 executes the processing of the Step S307 again.

(Step S308) The first processor 102 starts the active scan. Then, the first processor proceeds to the processing of the Step S309.

(Step S309) The first processor 102 determines whether the first communication device 103 receives the Advertising Packet from the shooting instruction terminal 201. When the first processor 102 determines that the first communication device 103 receives the Advertising Packet, the first processor proceeds to the processing of the Step S310, and when the first processor 102 determines that the first communication device 103 does not receive the Advertising Packet, the first processor 102 executes the Step S309 again.

(Step S310) The first processor 102 instructs the first communication device 103 to transmit the Scan Request packet to the shooting instruction terminal 201. Then, the first processor 102 proceeds to the processing of the Step S311.

(Step S311) The first processor 102 determines whether the first communication device 103 receives the Scan Response packet from the shooting instruction terminal 201. When the first processor 102 determines that the first communication device 103 receives the Scan Response packet, the first processor 102 proceed to the Step S312, and when the first processor 102 determines that the first communication device 103 does not receive the Scan Response packet, the first processor returns to the processing of the Step S309.

(Step S312) The first processor 102 starts the passive scan. Then, the first processor proceeds to the processing of the Step S313.

(Step S313) The first processor 102 determines whether the second repetition period has elapsed since the active scan starts during the processing of the Step S308. When the first processor 102 determines that the second repetition period has elapsed since the active scan starts during the processing of the Step S308, the first processor 102 returns to the processing of the Step S302, and when the first processor 102 determines that the second repetition period has not elapsed since the active scan starts during the processing of the Step S308, the first processor executes the processing of the Step S313 again.

During the processing described above, the Scan Request packet May be formed such that the first processor 102 instructs the first communication device 103 to transmit the Scan Request packet due to the Advertising Packet reception notification from the first communication device 103, and the Scan Request packet may be formed such that a processor (not shown) disposed inside the first communication device 103 transmits the Scan Request packet according to the instruction of "start active scan" from the first processor 102 once the Advertising Packet is received.

According to the processing described above, the situation that the control command is undelivered is considered and when the shooting instruction terminal 201 transmits the instruction (for example, shooting instruction, start video shooting instruction, and stop video shooting instruction) for one time, during the repetition transmission period, the shooting instruction terminal 201 repeatedly transmits the Advertising Packet that is added with the control command. Accordingly, the probability of the control command (shooting instruction) being delivered to the shooting terminal 101 can be improved.

According to the present embodiment, when the shooting instruction terminal 201 transmits the instruct ion for one time, during the repetition transmission period, the shooting instruction terminal 201 repeatedly transmits the Advertising Packet that is added with the control command. Accordingly, it is necessary to control the shooting terminal 101 not to repeatedly perform the processing according to the instruction, even if the shooting terminal 101 repeatedly receives the Advertising Packet. Thus, in the present embodiment, after the shooting terminal 101 receives the Advertising Packet, during the same repetition period, the shooting terminal 101 ignores the control command even if the shooting terminal 101 receives the Advertising Packet again. Accordingly, it is possible to prevent the shooting terminal 101 from repeatedly executing the control command that is repeatedly transmitted.

According to the present embodiment, after the shooting instruction terminal 201 transmits the Advertising Packet of the shooting instruction (after the first repetition period), in order to perform the delivery confirmation, the shooting instruction terminal 201 repeatedly performs the multiple addressing simultaneous transmission during the second repetition period to transmit the Advertising Packet of an awaiting response. Accordingly, the shooting instruction terminal 201 can prevent the congestion at the time of transmitting the Advertising Packet of the shooting instruction while confirm the shooting terminal 101 that has finished the shooting.

Second Embodiment

Next, a second embodiment of the present invention will be described. Configurations of the shooting system 1, the shooting terminal 101, and the shooting instruction terminal 201 according to the present embodiment are that same as that of the first embodiment.

Figure 11:
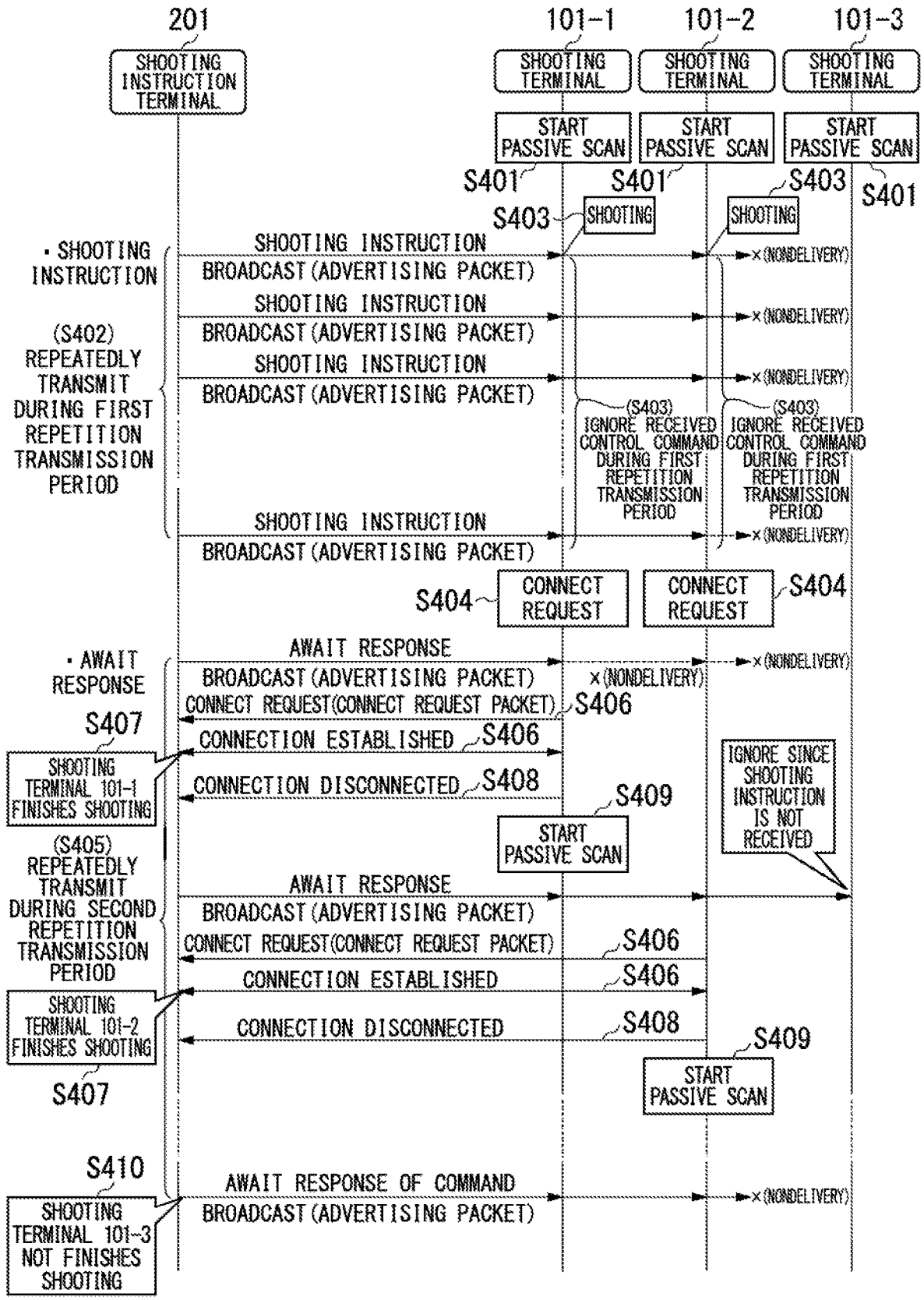
FIG. 11 is a sequence diagram showing a procedure of transmitting a shooting instruction from a shooting instruction terminal to a shooting terminal and confirming the delivery of the shooting instruction according to a second embodiment of the present invention.

In the present embodiment, in order to confirm whether the shooting instruction is delivered to the shooting terminal 101, the connect request (Connect Request) is used. FIG. 11 is a sequence diagram showing the procedures when the shooting instruction terminal 201 transmits the shooting instruction to the shooting terminal 101 and confirm the delivery of the shooting instruction.

The Steps S401 to S403 are the same with the Steps S101 to S103 shown in FIG. 8.

(Step S404) The shooting terminals 101-1 and 101-2 start connect request processing since the first repetition period has elapsed from the reception of the Advertising Packet of the shooting instruction. The connect request processing is a processing of returning the connect request (Connect Request packet) to establish a connection, once the Advertising Packet of an awaiting response is received. The shooting terminal 101-3 does not receive the Advertising Packet of the shooting instruction and thus does not perform any processing.

(Step S405) After the first repetition period, the shooting instruction terminal 201 repeatedly performs the multiple addressing simultaneous transmission of the Advertising Packet of the awaiting response during the second repetition period in order to perform the delivery confirmation. The shooting instruction terminal 201 finishes the repeatedly transmission of the Advertising Packet of the awaiting response after the second repetition period.

(Step S406) The shooting terminals 101-1 and 101-2 are processing the connect request. Accordingly, once the shooting terminals 101-1 and 101-2 receive the Advertising Packet of the awaiting response, the shooting terminals 101-1 and 101-2 transmit the Connect Request packet of the connect request to establish the connection. On the other hand, the shooting terminal 101-3 is performing the passive scan. Accordingly, even if the shooting terminal 101-3 receives the Advertising Packet of the awaiting response, the shooting terminal 101-3 does not perform any processing. In the example shown, the shooting terminal 101-1 receives the Advertising Packet of the awaiting response that is transmitted for the first time. The shooting terminal 101-2 receives the Advertising Packet of the awaiting response that is transmitted for the second time.

(Step S407) When a connection is established, the shooting instruction terminal 201 determines that the shooting by the shooting terminal 101 that established the connection is finished. In the example shown, the shooting instruction terminal 201 determines that the shooting by the shooting terminal 101-1 and 101-2 are finished.

(Step S408) The shooting terminals 101-1 and 101-2 disconnect the connections after the connections are established.

(Step S409) When the shooting terminals 101-1 and 101-2 disconnect the connection, the shooting terminals 101-1 and 101-2 start passive scan. Accordingly, even if the Advertising Packet of the awaiting response is received multiple times, the shooting terminals 101-1 and 101-2 can ignore the Advertising Packet of the awaiting response received for the second time and the subsequent times.

(Step S410) The shooting instruction terminal 201 determines that the shooting by the shooting terminal 101 that has not received the Connect Request packet to establish the connection is not finished at the time when the repeatedly transmission of the Advertising Packet of the awaiting response is finished. In the example shown, the shooting instruction terminal 201 determines that the shooting by the shooting terminal 101-3 is not finished.

Figure 12:
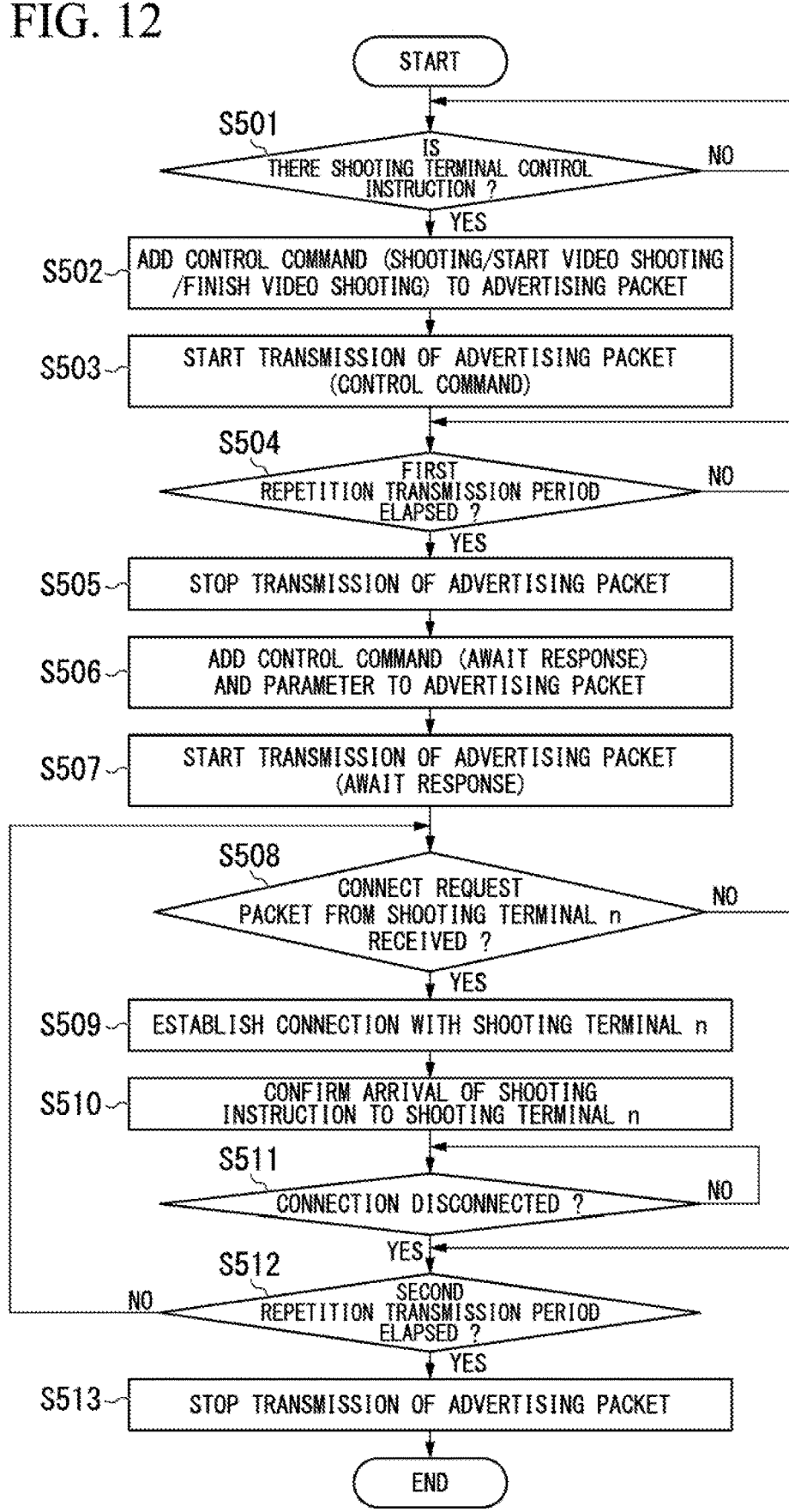
FIG. 12 is a flowchart showing an operation procedure of the shooting instruction terminal according to the second embodiment of the present invention.

Next, operations of the shooting instruction terminal 201 will be described. FIG. 12 is a flowchart showing the operation procedures of the shooting instruction terminal 201 according to the present embodiment. Steps S501 to S507 are the same with the Steps S201 to S207 shown in FIG. 9.

(Step S503) The second processor 202 determines whether the second communication device 203 receives the Connect Request packet from the shooting terminal 101-n. When the second processor 202 determines that the second communication device 203 receives the Connect Request packet from the shooting terminal 101-n, the second processor 202 proceeds to the processing of the Step S509, and when the second processor 202 determines that the second communication device 203 does not receive the Connect Request packet from the shooting terminal 101-n, the second processor 202 proceeds to the processing of the Step S512.

(Step S509) The second processor 202 instructs the second communication device 203 to establish the connection with the shooting terminal 101-n that is the transmission source of the Connect Request packet. Then, the second processor 202 proceeds to the processing of the Step S510.

(Step S510) The second processor 202 determines that the shooting terminal 101-n receives the shooting instruction that the command (confirms that the shooting instruction is delivered to the shooting terminal 101-n). Then, the second processor 202 proceeds to the processing of the Step S511.

(Step S511) The second processor 202 determines whether the connection with the shooting terminal 101-n that establishes the connection during the processing of the Step S509 is disconnected. When the second processor 202 determines that the connection is disconnected, the second processor 202 proceeds to the processing of the Step S512, and when the second processor 202 determines that the connection is not disconnected, the second processor 202 executes the processing of the Step S511 again.

(Step S512) The second processor 202 determines whether the second repetition period has elapsed. When the second processor 202 determines that the second repetition period has elapsed, the second processor 202 proceeds to the processing of the Step S513, and when the second processor 202 determines that the second repetition period is not elapsed, the second processor 202 returns to the processing of the Step S508.

(Step S513) The second processor 202 instructs the second communication device 203 to stop the repeatedly transmission of the Advertising Packet. Then, the processing is finished.

Figure 13:
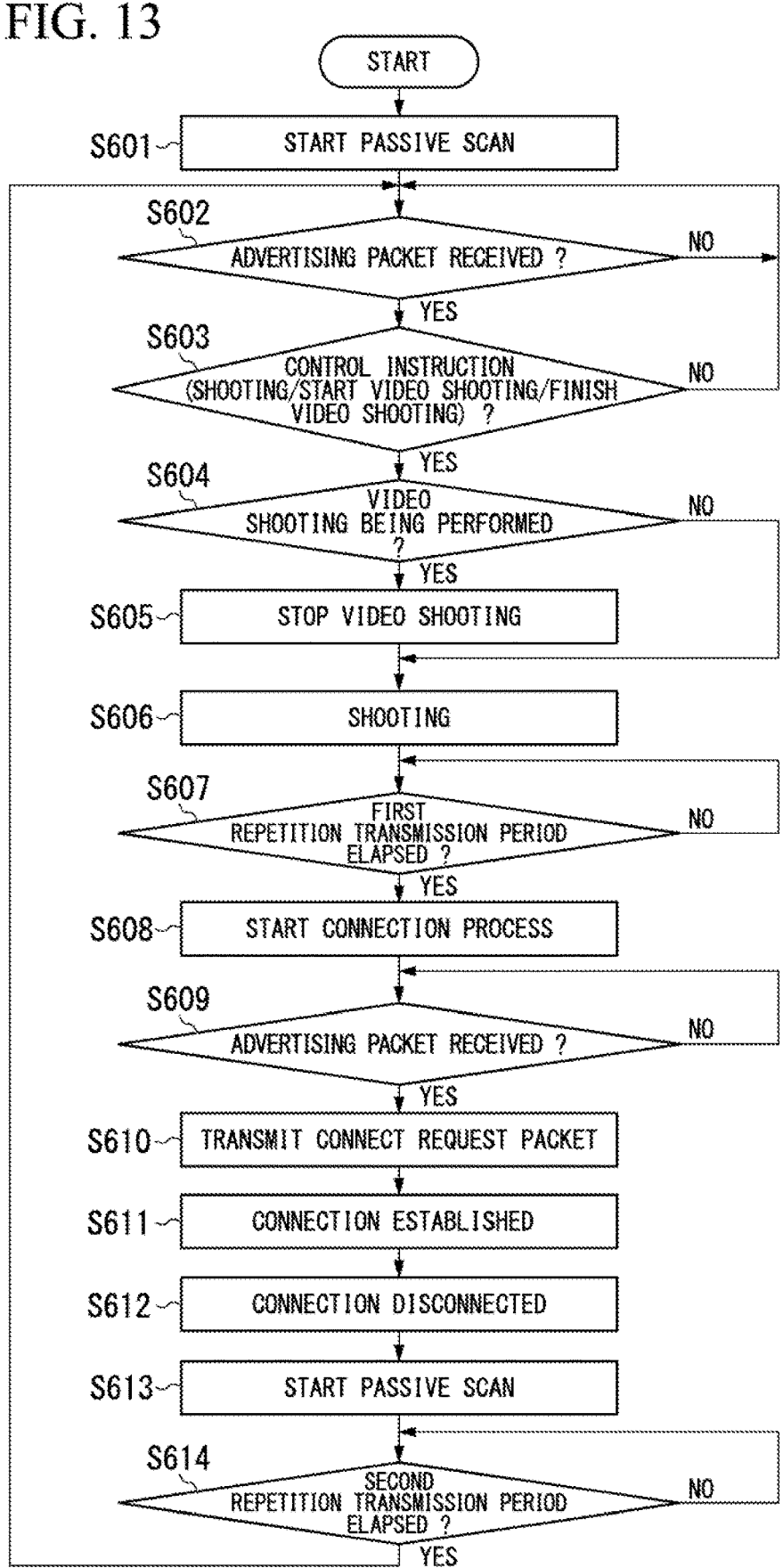
FIG. 13 is a flowchart showing an operation procedure of the shooting terminal according to the second embodiment of the present invention.

Next, operations of the shooting terminal 101 will be described. FIG. 13 is a flowchart showing the operation procedures of the shooting terminal 101 according to the present embodiment. Steps S601 to S607 are the same with the Steps S301 to S307 shown in FIG. 10.

(Step S608) The first processor 102 starts the connect processing. Then, the first processor 102 proceeds to the processing of the Step S609.

(Step S608) The first processor 102 determines whether the first communication device 103 receives the Advertising Packet from the shooting instruction terminal 201. When the first processor 102 determines that the first communication device 103 receives the Advertising Packet, the first processor 102 proceeds to the processing of the Step S610, and when the first processor 102 determines that the first communication device 103 does not receive the Advertising Packet, the first processor 102 executes the processing of the Step S609 again.

(Step S610) The first processor 102 instructs the first communication device 103 to transmit the Connect Request packet to the shooting instruction terminal 201. Then, the first processor 102 proceeds to the processing of the Step S611.

(Step S611) The first processor 102 instructs the first communication device 103 to establish a connection with the shooting instruction 201. Then, the first processor 102 proceeds to the processing of the Step S612.

(Step S612) The first processor 102 instructs the first communication device 103 to disconnect the connection that is established during the processing of the Step S611. Then, the first processor 102 proceeds to the processing of the Step S613.

(Step S613) The first processor 102 starts the passive scan. Then, the first processor 102 proceeds to the processing of the Step S614.

(Step S614) The first processor 102 determines whether the second repetition period has elapsed from the start of the connect processing during the processing of the Step S608. When the first processor 102 determines that the second repetition period has elapsed from the start of the connect processing during the processing of the Step S608, the first processor returns to the processing of the Step S602, and when the first processor 102 determines that the second repetition period is not elapsed from the start of the connect processing during the processing of the Step S608, the first processor 102 executes the processing of the Step S614 again.

During the processing described above, the active scan (receive the Advertising Packet→transmit the Scan Request packet→receive the Scan Response packet) may be performed before the transmission of the connect request (Connect Request packet). The disconnection of the connection may be performed by either of the shooting terminal 101 or the shooting instruction terminal 201.

Due to the reception notification of the Advertising Packet from the first communication device 103, the first processor 102 may be configured to instruct the first communication device 103 to transmit the Connect Request packet. A processor (not shown) disposed inside the first communication device 103 may be configured to transmit the connect Request packet according to the start connect processing instruction from the first processor 102 once the Advertising Packet is received.

According to the processing described above, in the present embodiment, considering the situation that the control command is undelivered, when the shooting instruction terminal 201 transmits the instruction (for example, shooting instruction, start video shooting instruction, and stop video shooting instruction) once, the shooting instruction terminal 201 repeatedly transmits the Advertising Packet added with the control command during the repetition period. Accordingly, the probability of the control command (shooting instruction) being delivered to the shooting terminal 101 can be improved.

According to the present embodiment, when the shooting instruction terminal 201 transmits the instruction once, the shooting instruction terminal 201 repeatedly transmits the Advertising Packet added with the control command during the repetition period. Accordingly, it is necessary to control the shooting terminal 101 not to repeatedly perform the processing according to the instruction, even if the shooting terminal 101 repeatedly receives the Advertising Packet.

Thus, in the present embodiment, after the shooting terminal 101 receives the Advertising Packet, during the same repetition period, the shooting terminal 101 ignores the control command even if the shooting terminal 101 receives the Advertising Packet again. Accordingly, it is possible to prevent the shooting terminal 101 from repeatedly executing the control command that is repeatedly transmitted.

According to the present embodiment, after the shooting instruction terminal 201 transmits the Advertising Packet of the shooting instruction (after the first repetition period), in order to perform the delivery confirmation, the shooting instruction terminal 201 repeatedly performs the multiple addressing simultaneous transmission during the second repetition period to transmit the Advertising Packet of the awaiting response. Accordingly, the shooting instruction terminal 201 can prevent the congestion at the time of transmitting the Advertising Packet of the shooting instruction while confirm the shooting terminal 101 that has finished the shooting.

As described above, the shooting instruction terminal 201 according to the first embodiment and the second embodiment can determine the shooting terminal 101 that has finished the shooting and the shooting terminal 101 that has not finished the shooting. Accordingly, for example, the shooting instruction terminal 201 can be configured to store (register) a number of the shooting terminals 101 included in the shooting system 1 in the second memory 204 in advance such that the shooting instruction terminal 201 can determine whether all of the shooting terminals 101 included in the shooting system 1 have finished the shooting by comparing a number of the shooting terminals 101 from which the response is returned with the stored number.

For example, the shooting instruction terminal 201 may be configured to store (register) information for identifying each of the shooting terminals such as a unique identifier (BD_ADDR) or a unique terminal name that is assigned to each shooting terminal 101 in advance such that the shooting instruction terminal 201 can determine which shooting terminal has finished the shooting or which shooting terminal failed during the shooting, and further the shooting instruction terminal 201 can exclude terminals whose identification information is not stored (registered) as noncompliant terminal of the present embodiment during the Step S208 and the Step S508.

Figure 14:
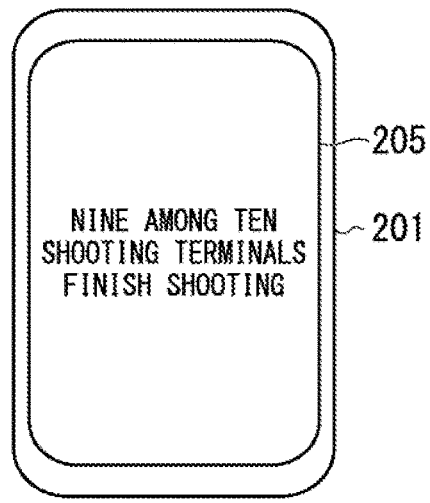
FIG. 14 is a schematic view showing an example of a judgement result display image displayed on a display unit of the shooting instruction terminal according to the second embodiment of the present invention.
Figure 15:
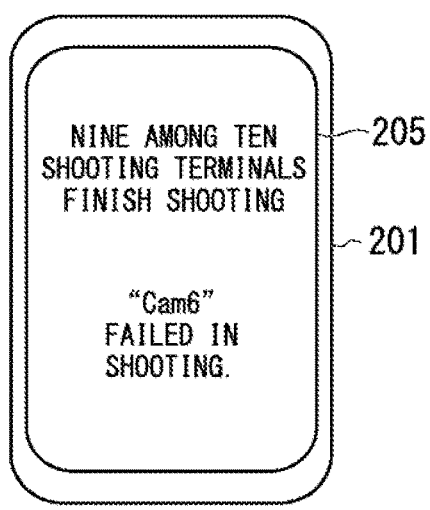
FIG. 15 is a schematic view showing an example of a judgement result display image displayed on a display unit of the shooting instruction terminal according to the second embodiment of the present invention.
Figure 16:
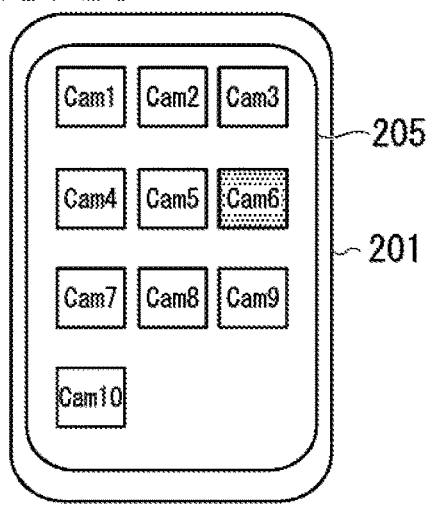
FIG. 16 is a schematic view showing an example of a judgement result display image displayed on a display unit of the shooting instruction terminal according to the second embodiment of the present invention.

The shooting instruction terminal 201 can instruct the display unit (user notification unit) 205 to display the above described determination results. FIGS. 14-16 are schematic views showing the example of the determination results view shown on the display unit 205 of the shooting instruction terminal 201.

In the example shown in FIG. 14, the shooting instruction terminal 201 shows "nine among ten shooting terminals finish shooting" as the determination results image on the display unit 205. It means that the number of the shooting terminals 101 included in the shooting system 1 is ten and the number of the shooting terminals 101 having finished the shooting is nine. In this way, the shooting instruction terminal 201 may be configured to display the number of the shooting terminals 101 included in the shooting system 1 and the number of the shooting terminals 101 having finished the shooting.

In the example shown in FIG. 15, the shooting instruction terminal 201 shows "nine among ten shooting terminals finish shooting. Cam 6 failed in shooting" as the determination results image on the display unit 205. It means that the number of the shooting terminals 101 included in the shooting system 1 is ten and the number of the shooting terminals 101 having finished the shooting is nine. Also, it means that among the shooting terminals 101, the shooting terminal 101 having the terminal name of "Cam 6" failed during the shooting.

In this way, the shooting instruction terminal 201 may be configured to display the number of the shooting terminals 101 included in the shooting system 1 and the number of the shooting terminals 101 having finished the shooting. Furthermore, the shooting instruction terminal 201 may be configured to display the information for identifying the shooting terminal 101 failed in the shooting in addition.

In the example shown in FIG. 16, the shooting instruction terminal 201 shows icons of "Cam 1" to "Cam 10" as the determination results image on the display unit 205, and only the icon of "Cam 6" is displayed in a gray out style. It means that the shooting system 1 includes the shooting terminals 101 having the terminal names "Cam 1" to "Cam 10" and the shooting, terminal 101 having the terminal name "Cam 6" failed during the shooting.

In this way, the shooting instruction terminal 201 may display the icons identifying the shooting terminal 101 included in the shooting system 1 as the determination results image. The shooting instruction terminal 201 may have different display modes for the icons identifying the shooting terminal 101 that has finished the shooting and the icons identifying the shooting terminal 101 that failed during the shooting.

The shooting instruction terminal 201 may include a speaker (user notification unit, not shown) to output the above described determination results in voice using the speaker. For example, the shooting instruction terminal 201 may control the speaker to output a voice "nine among ten shooting terminals finish shooting" as the determination results. It means that the number of the shooting terminals 101 included in the shooting system 1 is ten and the number of the shooting terminals 101 that have finished the shooting is nine. In this way, the shooting instruction terminal 201 may output the number of the shooting terminals 101 included in the shooting system 1 and the number of the shooting terminals 1 that have finished the shooting as the determination results in voice using the speaker.

The first repetition period described above may be a predetermined value, however, since there is a case that the probability of the Advertising Packet being undelivered becomes higher due to the environment, the first repetition period can be changed to an arbitrary value to increase/decrease the times of the multiple addressing simultaneous transmission for suitably adapting the environment. For example, in a case when the wireless communication environment is poor, the probability of the Advertising Packet being undelivered can be decreased by extending the first repetition period.

In this case, the shooting instruction terminal 201 sets the control command and the arbitrary first repetition period as the parameters of the Advertising Packet of the shooting instruction and transmits the packet using the multiple addressing simultaneous transmission. Accordingly, the shooting terminal 101 can figure out the changed first repetition period by referring to the arbitrary first repetition period set to the Advertising Packet of the shooting instruction even if the shooting instruction terminal 201 changes the first repetition period to an arbitrary value.

With regard to the second repetition period, in the same way, the second repetition period may be changed to an arbitrary value to increase/decrease the times of the multiple addressing simultaneous transmission for suitably adapting the environment.

In this case, the shooting instruction terminal 201 sets the control command and the arbitrary second repetition period as the parameters of the Advertising Packet of the awaiting response and transmits the packet using the multiple addressing simultaneous transmission. Accordingly, the shooting terminal 101 can figure out the changed second repetition period by referring to the arbitrary second repetition period set to the Advertising Packet of the awaiting response even if the shooting instruction terminal 201 changes the second repetition period to an arbitrary value.

Third Embodiment

Next, a third embodiment of the present invention will be described. Configurations of the shooting system 1, the shooting terminal 101, and the shooting instruction terminal 201 according to the present embodiment are the same with the first embodiment.

Figure 17:
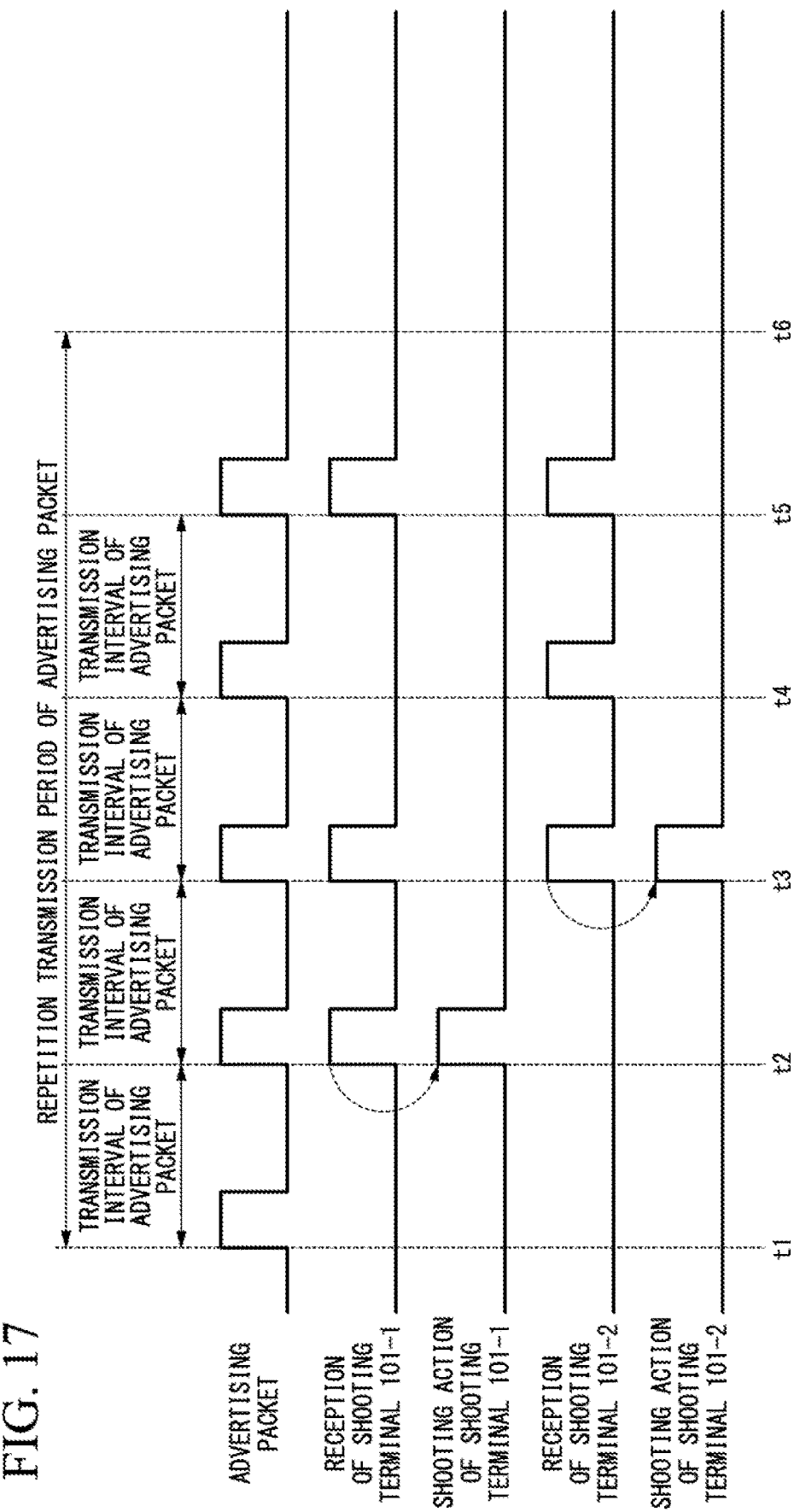
FIG. 17 is a timing diagram showing timing relationships of shooting processing of the shooting terminal according to the first and second embodiments of the present invention.

According to the first embodiment and the second embodiment, the shooting terminal 101 receiving the control command (shooting instruction) performs the shooting processing only once after receiving the control command (shooting instruction). FIG. 17 is a timing diagram showing the timing when the shooting terminal 101 performs the shooting processing according to the first embodiment and the second embodiment.

In the example shown, the shooting instruction terminal 201 transmits the Advertising Packet for five times at each of the time t1 to t5 per each interval of the transmission of the Advertising Packet during the first repetition period of the Advertising Packet (in the example shown, the period from the time t1 to the time t6).

In the example shown, the shooting terminal 101-1 receives the transmitted Advertising Packet at the time t2 and performs the shooting processing at the time t2 when the shooting terminal 101-1 receives the Advertising Packet. The shooting terminal 101-1 also receives the Advertising Packet at the time t3 and the time t5; however, the shooting terminal 101-1 ignores the shooting instruction of the Advertising Packet received front the reception of the Advertising Packet for the first time during the first repetition period. Accordingly, the shooting terminal 101-1 can execute the shooting processing only once even if the shooting terminal 101-1 receives the Advertising Packets multiple times.

In the example shown, the shooting terminal 101-2 receives the transmitted Advertising Packet at the time t3 and performs the shooting processing at the time t3 when the shooting terminal 101-2 receives the Advertising Packet. The shooting terminal 101-2 also receives the Advertising Packet at the time t4 and the time t5, however, the shooting terminal 101-2 ignores the shooting instruction of the Advertising Packet received from the reception of the Advertising Packet for the first time during the first repetition period. Accordingly, the shooting terminal 101-2 can execute the shooting processing only once even if the shooting terminal 101-1 receives the Advertising Packets multiple times.

However, in the example shown in FIG. 17, the shooting terminal 101-1 performs the shooting at the time t2, and the shooting terminal 101-2 performs the shooting at the time t3. Accordingly, the time when the shooting terminal 101-1 performs the shooting is different with that of the shooting terminal 101-2.

In the present embodiment, the shooting terminals 101 included in the shooting system 1 perform the shooting processing such that at least one image can be captured at the same time. Specifically, in the present embodiment, the shooting terminal 101 receiving the control command (shooting instruction) repeatedly performs the shooting processing after receiving the control command (shooting instruction) by matching the transmission interval of the Advertising Packet.

Figure 18:
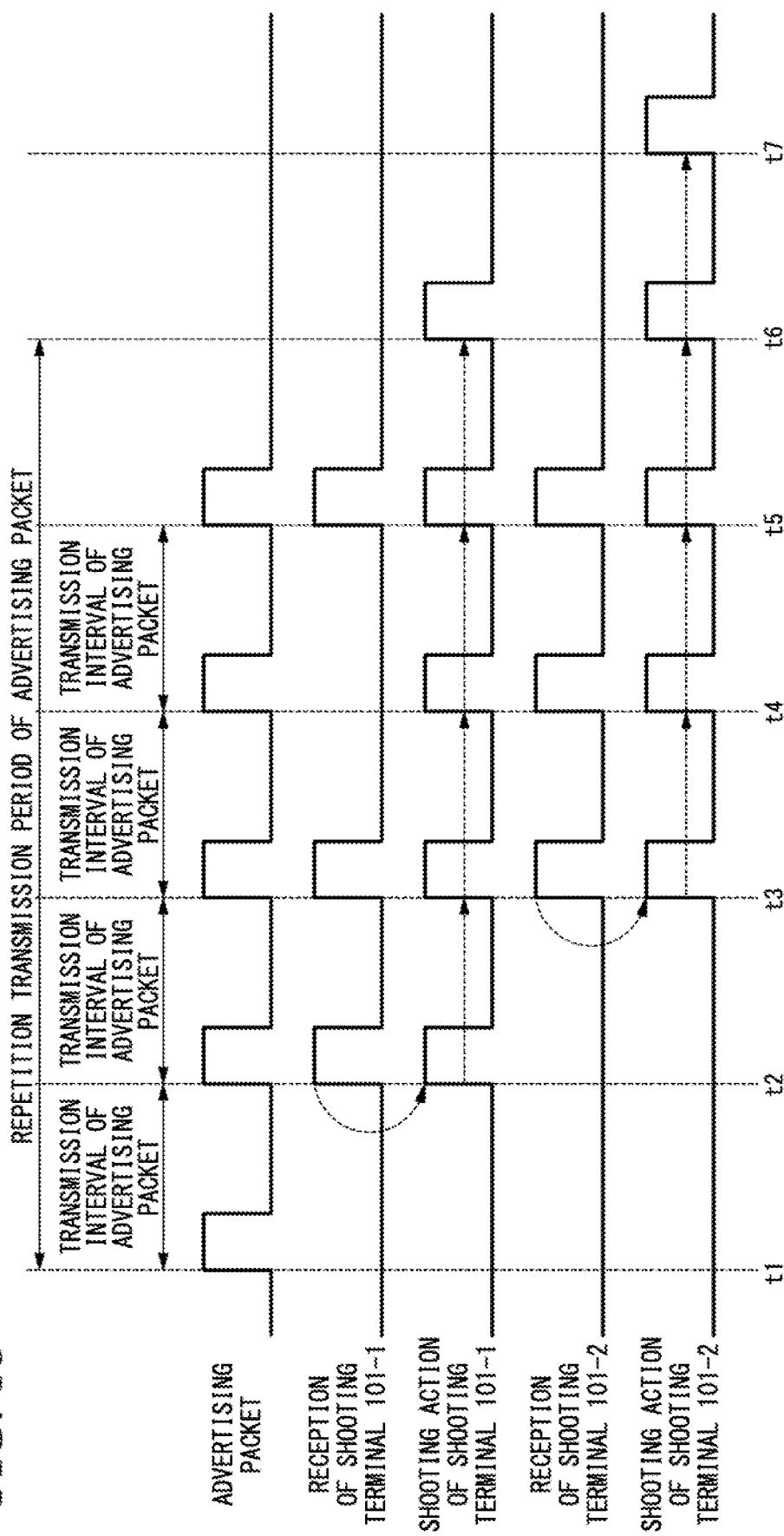
FIG. 18 is a timing diagram showing timing relationships of multiple shooting processing performed by a shooting terminal according to a third embodiment of the present invention.

FIG. 18 is a timing diagram showing the timing when the shooting terminal 101 performs the shooting multiple times according to the present embodiment. In the example shown, the shooting instruction terminal 201 transmits the Advertising Packet for five times at the time t1 to t5 per each transmission interval of the Advertising Packet during the first repetition period of the Advertising Packet (in the example shown, the period between t1 to t6).

In the example shown, the shooting terminal 101-1 receives the transmitted Advertising Packet at the time t2 and performs the shooting processing at the time t2 when the shooting terminal 101-1 receives the Advertising Packet. Furthermore, the shooting terminal 101-1 repeatedly performs the shooting processing at the time t3 to t6 by matching the transmission interval of the Advertising Packet during the period from the time t2 until the repetition period of the Advertising Packet has elapsed (in the example shown, the period between time t2 to t7). That is, the shooting terminal 101-1 performs a series of shooting processing according to the Advertising Packet received at the time t2.

The shooting terminal 101-1 also receives the Advertising Packet at the time t3 and the time t5, however, the shooting terminal 101-1 ignores the shooting instruction of the Advertising Packet received from the reception of the Advertising Packet for the first time during the first repetition period. Accordingly, the shooting terminal 101-1 can execute the shooting processing only once even if the shooting terminal 101-1 receives the Advertising Packets multiple times.

In the example shown, the shooting terminal 101-2 receives the transmitted Advertising Packet at the time t3 and performs the shooting processing at the time t3 when the shooting terminal 101-2 receives the Advertising Packet. Furthermore, the shooting terminal 101-2 repeatedly performs the shooting processing at the time t4 to t7 by matching the transmission interval of the Advertising Packet during the period from the time t3 until the repetition period of the Advertising Packet has elapsed (in the example shown, the period between time t3 to t8). That is, the shooting terminal 101-2 performs a series of shooting processing according to the Advertising Packet received at the time t3.

The shooting terminal 101-2 also receives the Advertising Packet at the time t4 and the time t5, however, the shooting terminal 101-2 ignores the shooting instruction of the Advertising Packet received from the reception of the Advertising Packet for the first time during the first repetition period. Accordingly, the shooting terminal 101-2 can execute the shooting processing only once even if the shooting terminal 101-1 receives the Advertising Packets multiple times.

In this way, even if the timing when each shooting terminal 101 receives the Advertising Packet is different, it is possible to shoot an image at the same timing. For example, in the example shown in FIG. 18, the shooting terminal 101-1 shoots images at the time t2 to t6, and the shooting terminal 101-2 shoots images at the time t3 to t7. Accordingly, the shooting terminal 101-1 and the shooting terminal 101-2 can shoot at least one image at the same time.

The operation of the shooting instruction terminal 201 according to the present embodiment is that same as that of the shooting instruction terminal 201 according to the first embodiment.

Figure 19:
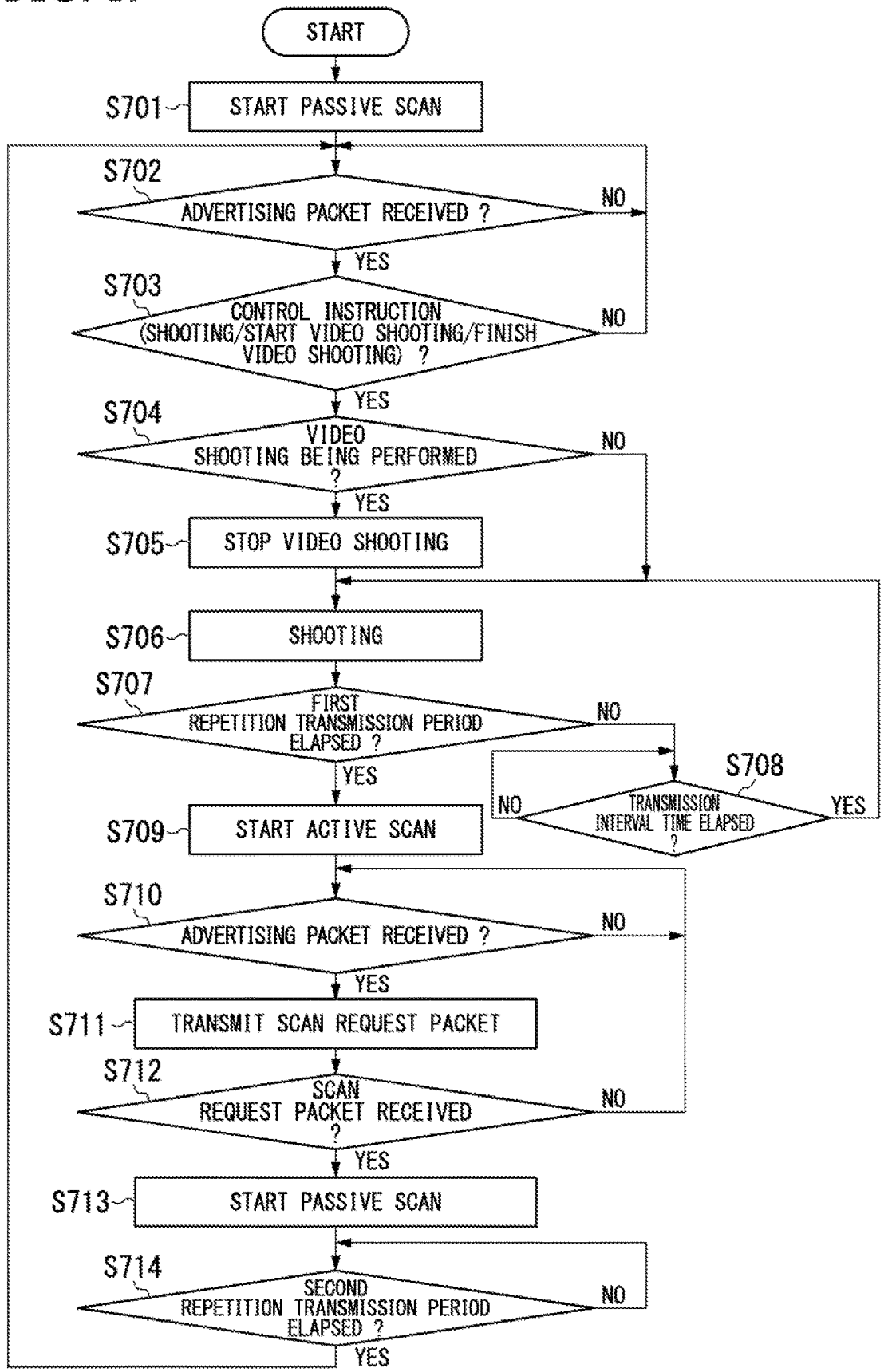
FIG. 19 is a flowchart showing an operation procedure of the shooting terminal according to the third embodiment of the present invention.

Next, the operations of the shooting terminal 101 according to the present embodiment will be described. FIG. 19 is a flowchart showing the operation procedures of the shooting terminal 101 according to the present embodiment. The processing of the Step S701 to the Step 706 are the same with the processing of the Step S301 to the Step S306 shown in FIG. 10.

(Step S707) The first processor 102 determines whether the first repetition period has elapsed from the reception of the Advertising Packet in the processing of the Step S702. When the first processor 102 determines that the first repetition period has elapsed from the reception of the Advertising Packet in the processing of the Step S702, the first processor 102 proceeds to the processing of the Step S709, and when the first processor 102 determines that the first repetition period is not elapsed from the reception of the Advertising Packet in the processing of the Step S702, the first processor 102 proceeds to the processing of the Step S708.

(Step S708) The first processor 102 determines whether the transmission interval time of the Advertising Packet has elapsed from the shooting control in the processing of the Step S706. When the first processor 102 determines that the transmission interval time of the Advertising Packet has elapsed from the shooting control in the processing of the Step S706, the first processor returns to the processing of the Step S706, and when the first processor 102 determines that the transmission interval time of the Advertising Packet is not elapsed from the shooting control in the processing of the Step S706, the first processor executes the processing of the Step S708 again.

The processing of the Step S709 to the Step S714 is that same as that of the Step S308 to the Step S313 shown in FIG. 10. The operations of the shooting system 1 may be applied to the operations of the shooting system 1 according to the second embodiment.

In the example described above, in the case when the transmission interval of the Advertising Packet is determined in advance, the shooting terminal 101 repeatedly performs the shooting processing according to the predetermined repetition period and transmission interval.

The repetition transmission period and the transmission interval may be a predetermined value, however, since there is a case that the probability of the Advertising Packet being undelivered becomes higher due to the environment, the repetition transmission period and the transmission interval can be changed to arbitrary values to increase/decrease the times of the multiple addressing simultaneous transmission for suitably adapting the environment. For example, in a case when the wireless communication environment is poor, the probability of the Advertising Packet being undelivered can be decreased by extending the repetition transmission period or shortening the transmission interval to increase the times of the Advertising Packet transmission.

In this case, the shooting instruction terminal 201 sets the Control command, an arbitrary repetition transmission period, and an arbitrary transmission interval to the Advertising Packet and transmit the packet using the multiple addressing simultaneous transmission. Accordingly, the shooting terminal 101 can figure out the changed repetition transmission period and the transmission interval by referring to the arbitrary repetition transmission period and the transmission interval set to the Advertising Packet even if the shooting instruction terminal 201 changes the repetition transmission period and the transmission interval to arbitrary values.

FIG. 20 is a schematic view showing an example of an Advertising Data (AdvData) according to the present embodiment. In the example shown, the Advertising Data (AdvData) includes "Flags", "Service UUID", and "Control Command".

The "Flags" and the "Service UUID" are the same with the example shown in FIG. 6. The "Control Command" includes "Code", "Duration", and "Interval". The "Code" is the same with the "Control Command (Code)" shown in FIG. 6. The "Duration" is the repetition transmission period of the Advertising Packet. The "Interval" is the transmission interval of the Advertising Packet.

Accordingly, the shooting terminal 101 can figure out the changed repetition transmission period and the transmission interval by referring to the arbitrary repetition transmission period and the transmission interval set to the Advertising Packet even if the shooting instruction terminal 201 changes the repetition transmission period and the transmission interval to arbitrary values. Thus, each of the shooting terminals 101 can shoot an image at the same timing even if the shooting terminals 101 receive the Advertising Packet at different timing.

Also, the "Duration" may be replaced with the "Total Tx number". The "Total Tx Number" is the total transmission times. In this case, the "transmission interval of the Advertising Packet" can be calculated by dividing the "first repetition period (repetition transmission period of the Advertising Packet)" by the total transmission times.

Furthermore, the shooting instruction terminal 201 may cause the packet number to be included in the Advertising Data (AdvData), add the packet number to each Advertising Packet and transmit the Advertising Packet. FIG. 21 is a schematic view showing the example of including the packet number in the Advertising Data (AdvData) according to the present embodiment. In the example shown, the Advertising Data (AdvData) includes the "Flags", the "Service UUID", and the "Control Command".

The "Flags" and the "Service UUID" are the same with the example shown in FIG. 6. The "Control Command" includes the "Code", the "Duration", the "Interval", and the "Packet No.". The "Code", the "Duration", and the "Interval" are the same with the example shown in FIG. 19. The "Packet No." is the packet number for identifying each of the packet. With regard to numbering of the packet number, for example, the packet number (for example, 0, 1, and 10) of the Advertising Packet that is transmitted at first is the starting point and the packet number will be increased per each transmission of one packet.

In this case, the shooting terminal 101 adds a packet number to the Advertising Packet that is received at first as the starting point, increases the packet number per each shooting, and store the image data associated with the packet number.

In this way, the shooting instruction terminal 201 adds the packet number to each Advertising Packet and transmit the packet. The shooting terminal 101 adds a packet number to the Advertising Packet that is received at first as the starting point, increases the packet number per each shooting, and store the image data associated with the packet number. Accordingly, the image data with the same packet number among the image data shot by each shooting terminal 101 can be collected as the image data that is shot at the same timing. Comparing to the known, method of collecting the image data by using the timestamp of each image data, it is not necessary to adjust the time of multiple shooting terminals 101 according to the present method.

For example, in the example shown in FIG. 18, the shooting instruction terminal 201 adds the number 11 to the Advertising Packet transmitted at the time t1, adds the number 12 to the Advertising Packet transmitted at the time t2, adds the number 13 to the Advertising Packet transmitted at the time t3, adds the number 14 to the Advertising Packet transmitted at the time t4, and adds the number 15 to the Advertising Packet transmitted at the time t5.

In this case, the shooting terminal 101-1 receives the Advertising Packet at the time t2 such that the shooting terminal 101-1 adds the number 12 added to the Advertising Packet to the image shot at the time t2. Also, the shooting terminal 101-1 adds the number 13 to the image shot at the time t3, adds the number 14 to the image shot at the time t4, adds the number 15 to the image shot at the time t5, and adds the number 16 to the image shot at the time t6.

The shooting terminal 101-2 receives the Advertising Packet at the time t3 such that the shooting terminal 101-2 adds the number 13 added to the Advertising Packet to the image shot at the time t3. Also, the shooting terminal 101-2 adds the number 14 to the image shot at the time t4, adds the number 15 to the image shot at the time t5, adds the number 16 to the image shot at the time t6, and adds the number 17 to the image shot at the time t7.

In this way, it is easy to determine that the image shot by the shooting terminal 101-1 with the number 13 and the image shot by the shooting terminal 101-2 with the number 13 are shot at the same timing. Also, it is easy to determine that the image shot by the shooting terminal 101-1 with the number 14 and the image shot by the shooting terminal 101-2 with the number 14 are shot at the same timing. It is easy to determine that the image shot by the shooting terminal 101-1 with the number 15 and the image shot by the shooting terminal 101-2 with the number 15 are shot at the same timing. It is easy to determine that the image shot by the shooting terminal 101-1 with the number 16 and the image shot by the shooting terminal 101-2 with the number 16 are shot at the same timing.

The shooting terminal 101 may associate the shot image data with the various parameters included in the Advertising Data and store the associated image data and the various parameters included in the Advertising Data. In this way, it is possible to confirm the image data, the repetition transmission period of the Advertising Packet, and the transmission interval of the Advertising Packet together.

With regard to the video shooting, the same number may be added to the motion video shot at the same timing. Specifically, the shooting terminal 101 receiving the control command (start video shooting instruction) divides the video into multiple chapters in accordance with the transmission interval of the Advertising Packet after receiving the control command (start video shooting instruction). The shooting terminal 101 adds a packet number to each chapter with increment, wherein the packet number of the Advertising Packet that is received at first is the starting point. The shooting terminal 101 superposes (associates) and stores the packet number of each chapter of the motion video as an index. In this way, the motion video data with the same packet number among the video data shot by each shooting terminal 101 can be collected as the motion video data that is shot at the same timing.

Figure 22:
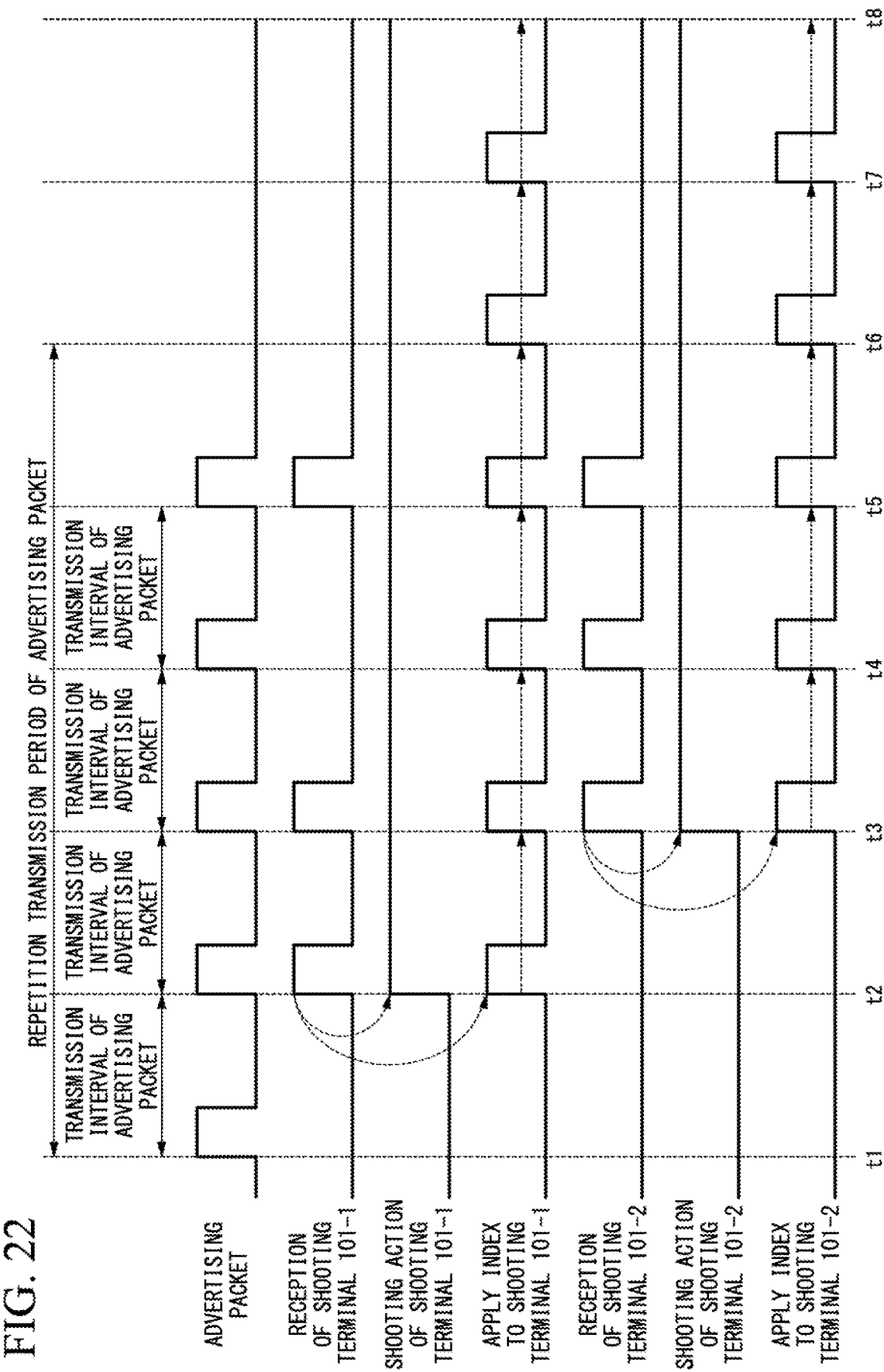
FIG. 22 is a timing diagram showing an example of adding an index to each chapter of the video by the shooting terminal according to the third embodiment of the present invention.

FIG. 22 is a timing diagram showing an example of the shooting terminal 101 adding the index to each chapter of the motion video according to the present embodiment. In the example shown, the shooting instruction terminal 201 transmits the Advertising Packet for five times at the time t1 to t5 per each transmission interval of the Advertising Packet during the first repetition period (in the example shown, the period between the time t1 to t6) of the Advertising Packet.

At this time, the shooting instruction terminal 201 adds the number 11 to the Advertising Packet transmitted at the time t1, adds the number 12 to the Advertising Packet transmitted at the time t2, adds the number 13 to the Advertising Packet transmitted at the time t3, adds the number 14 to the Advertising Packet transmitted at the time t4, and adds the number 15 to the Advertising Packet transmitted at the time t5.

In the example shown, the shooting terminal 101-1 receives the transmitted Advertising Packet at the time t2, starts the video shooting at the time t2 when the Advertising Packet is received, and adds the index in accordance with the transmission interval of the Advertising Packet.

In this case, since the shooting terminal 101-1 receives the Advertising Packet at the time t2, the motion video shot from the time t2 to the time t3 is divided as a chapter, and the shooting terminal 101-1 adds the number 12 that is added to the Advertising packet to the chapter as an index. The shooting terminal 101-1 divided the video shot from the time t3 to the time t4 as a chapter and adds an increased number 13 to the chapter, divided the video shot from the time t4 to the time t5 as a chapter and adds an increased number 14 to the chapter, divided the video shot from the time t5 to the time t6 as a chapter and adds an increased number 15 to the chapter, and divided the video shot from the time t6 to the time t7 as a chapter and adds an increased number 16 to the chapter. The shooting terminal 101-1 continues to add the increased number to the chapter as an index after the time t7 unit the motion video shooting is finished.

In this case, since the shooting terminal 101-2 receives the Advertising Packet at the time t3, the motion video shot between the time t3 to the time t4 is divided as a chapter, and the shooting terminal 101-2 adds the number 13 that is added to the Advertising Packet to the chapter as an index. The shooting terminal 101-2 divided the video shot from the time t4 to the time t5 as a chapter and adds an increased number 14 to the chapter, divided the video shot from the time t5 to the time t6 as a chapter and adds an increased number 15 to the chapter, divided the video shot from the time t6 to the time t7 as a chapter and adds an increased number 16 to the chapter, and divided the video shot from the time t7 to the time t8 as a chapter and adds an increased number 17 to the chapter. The shooting terminal 101-2 continues to add the increased number to the chapter as an index after the time t8 unit the motion video shooting is finished.

The shooting terminal 101-1 also receives the Advertising Packet at the time t3 and the time t5, however, the shooting terminal 101-1 ignores the shooting instruction of the Advertising Packet received from the reception of the Advertising Packet for the first time during the first repetition period. Accordingly, the shooting terminal 101-1 can execute the shooting processing only once even if the shooting terminal 101-1 receives the Advertising Packets multiple times.

The shooting terminal 101-2 also receives the Advertising Packet at the time t4 and the time t5, however, the shooting terminal 101-2 ignores the shooting instruction of the Advertising Packet received from the reception of the Advertising Packet for the first time during the first repetition period. Accordingly, the shooting terminal 101-2 can execute the shooting processing only once even if the shooting terminal 101-1 receives the Advertising Packets multiple times.

In this way, even if the timing when each shooting terminal 101 receives the Advertising Packet is different, it is possible to add an index at the same timing. For example, in the example shown in FIG. 22, the shooting terminal 101-1 adds the index with increment in accordance with the transmission interval of the Advertising Packet from the time t2 as the starting point. The shooting terminal 101-2 adds the index with increment in accordance with the transmission interval of the Advertising Packet from the time t3 as the starting point. Accordingly, the shooting terminal 101-1 and the shooting terminal 101-2 can add at least one index at the same timing. It becomes easy to match the timing by using the index during the processing of generating a single video from the multiple video data.

The shooting terminal 101 may associate the shot video data with the various parameters included in the Advertising Packet and store them. Accordingly, it is possible to confirm the video data, the repetition transmission period, and the transmission interval of the Advertising Packet together.

All of the functions or part of the functions of each unit included in the shooting terminal 101 according to the embodiments described above, and all of the functions or part of the functions of each unit included in the shooting instruction terminal 201 according to the embodiments described above may be realized by recording a program for realizing the functions on a computer-readable recording medium and causing a computer system to read and execute the program recorded on the recording medium. The computer system refers to a system including an operating system (OS) and hardware such as peripheral devices.

The computer-readable recording medium refers to a removable medium such as a flexible disk, a magneto-optical disk, a read-only memory (ROM), and a compact disk read-only memory (CD-ROM), and a storage unit such as a hard disk disposed inside the computer system. Furthermore, in a case that the program is transferred through a network such as the internet and a communication line such as the telephone line, the computer-readable recording medium may refer to the communication line that is configured to maintain the program temporarily and dynamically, and in this case, the computer-readable recording medium may also refer to the device configured to maintain the program for a certain period such as a volatile memory inside the computer system used as a server or a client. The program may be a program for realizing part of the functions described above and the program may be combined with the program recorded in the computer system to realize the functions.

The embodiments of the invention have been described above with reference to the drawings, but specific structures of the invention are not limited to the embodiments and may include various modifications without departing from the scope of the invention. The invention is not limited to the above-mentioned embodiments and is limited only by the accompanying claims.

What is claimed is:

1. A shooting terminal configured to shoot in response to a shooting instruction transmitted from a shooting instruction terminal by an electromagnetic wave, comprising:
    a processor; and
    a communication device configured to communicate using the electromagnetic wave,
    wherein a specific broadcast transmission packet is defined as a broadcast transmission packet including information indicating the shooting instruction at the data link level, and a non-specific broadcast transmission packet is defined as a broadcast transmission packet without the information indicating the shooting instruction at the data link level, and
    wherein at a first time that is defined as the time when the specific broadcast transmission packet transmitted from the shooting instruction terminal which has not established a connection with the shooting instruction terminal at the data link level, is received by the communication device, the processor is configured to
- start a first mode in which a response to the broadcast transmission packet is not returned,
- control the communication device to not to transmit packets at the data link level to the shooting instruction terminal in response to the broadcast transmission packet received by the communication device at the first time and another broadcast transmission packet received by the communication device after the first time,
- start a second mode in which a response to the broadcast transmission packet is returned at a second time after the first time, and
- control the communication device to transmit a packet at the data link level to the shooting instruction terminal in response to the non-specific broadcast transmission packet.

2. The shooting terminal according to claim 1,
wherein the processor is configured to
- start a passive scan mode as the first mode,
- switch the passive scan mode to an active scan mode as the second mode, and
- control the communication device to transmit a scan request packet for discovering the shooting instruction terminal positioned around the shooting terminal to the shooting instruction terminal as a packet at the link data level in response to the non-specific broadcast transmission packet.

3. The shooting terminal according to claim 2,
wherein the broadcast transmission packet is an Advertising Packet according to the Bluetooth protocol, and
wherein the processor is configured to control the communication device to transmit a Scan Request packet according to the Bluetooth protocol to the shooting instruction terminal as the scan request packet.

4. The shooting terminal according to claim 1, wherein the processor is configured to control the communication device to transmit a communication connect request packet for requesting a communication connection at the data link level to the shooting instruction terminal as a packet at the data link level in response to the non-specific broadcast transmission packet.

5. The shooting terminal according to claim 4,
wherein the broadcast transmission packet is an Advertising Packet according to the Bluetooth protocol, and
wherein the processor is configured to
- start a passive scan mode as the first mode,
- start a mode to perform a connect request as the second mode, and
- control the communication device to transmit a Connect Request packet according to the Bluetooth protocol to the shooting instruction terminal as the communication connect request packet.

6. The shooting terminal according to claim 1, wherein the processor is configured to switch the first mode to the second mode after a predetermined period has elapsed from the first time.

7. A shooting system, comprising:
a shooting instruction terminal including an instruction terminal communication device and an instruction terminal processor, the instruction terminal communication device communicating using an electromagnetic wave; and a shooting terminal including a communication device and a processor, the communication device communicating using the electromagnetic wave, wherein the shooting terminal is configured to shoot in response to a shooting instruction transmitted from the shooting instruction terminal by the electromagnetic wave, wherein a specific broadcast transmission packet is defined as a broadcast transmission packet including information indicating the shooting instruction at the data link level, and a non-specific broadcast transmission packet is defined as a broadcast transmission packet without the information indicating the shooting instruction at the data link level, wherein at a first time that is defined as the time when the specific broadcast transmission packet transmitted from the shooting instruction terminal which has not established a connection with the shooting instruction terminal at the data link level, is received by the communication device, the processor is configured to
- start a first mode in which a response to the broadcast transmission packet is not returned,
- control the communication device to not to transmit packets at the data link level to the shooting instruction terminal in response to the broadcast transmission packet received by the communication device at the first time and another broadcast transmission packet received by the communication device after the first time,
- start a second mode in which a response to the broadcast transmission packet is returned at a second time after the first time, and
- control the communication device to transmit a packet at the data link level to the shooting instruction terminal in response to the non-specific broadcast transmission packet.

8. A shooting method of a shooting terminal including a communication device configured to communicate using an electromagnetic wave and a processor, the shooting terminal configured to shoot in response to a shooting instruction transmitted from a shooting instruction terminal by the electromagnetic wave, comprising:
- defining a specific broadcast transmission packet as a broadcast transmission packet including information indicating the shooting instruction at the data link level;
- defining a non-specific broadcast transmission packet as a broadcast transmission packet without the information indicating the shooting instruction at the data link level;
- starting a first mode in which a response to the broadcast transmission packet is not returned at a first time, the first time being defined as the time when the specific broadcast transmission packet transmitted from the shooting instruction terminal which has not established a connection with the shooting instruction terminal at the data link level, is received by the communication device;
- controlling packets at the data link level in response to the broadcast transmission packet received by the communication device at the first time and another broadcast transmission packet received by the communication device after the first time not to be transmitted from the communication device to the shooting instruction terminal;
- starting a second mode in which a response to the broadcast transmission packet is returned at a second time after the first time; and controlling a packet at the data link level in response to the non-specific broadcast transmission packet to be transmitted from the communication device to the shooting instruction terminal.

9. A non-transitory computer-readable recording medium storing a program for operating a Shooting terminal the shooting terminal configured to shoot in response to a shooting instruction transmitted from a shooting instruction terminal by an electromagnetic wave, and the shooting terminal including a processor and a communication device configured to communicate using the electromagnetic wave, the program comprising:
   defining a specific broadcast transmission packet as a broadcast transmission packet including information indicating the shooting instruction at the data link level;
   defining a non-specific broadcast transmission packet as a broadcast transmission packet without the information indicating the shooting instruction at the data link level;
   causing the processor of the shooting terminal to
      start a first mode in which a response to the broadcast transmission packet is not returned at a first time, the first time being defined as the time when the specific broadcast transmission packet transmitted from the shooting instruction terminal which has not established a connection with the shooting instruction terminal at the data link level, is received by the communication device;
      control packets at the data link level in response to the broadcast transmission packet received by the communication device at the first time and another broadcast transmission packet received by the communication device after the first time not to be transmitted from the communication device to the shooting instruction terminal;
      start a second mode in which a response to the broadcast transmission packet is returned at at second time after the first time; and
      control a packet at the data link level in response to the non-specific broadcast transmission packet to be transmitted from the communication device to the shooting instruction terminal.

10. A shooting instruction terminal configured to transmit a shooting instruction to one or more than one shooting terminals by using an electromagnetic wave, comprising:
   a communication device configured to communicate using the electromagnetic wave;
   a user notification unit; and
   a processor,
   wherein a broadcast transmission packet is defined as the Advertising Packet according to the Bluetooth protocol, a specific broadcast transmission packet is defined as the broadcast transmission packet including information indicating the shooting instruction at the data link level, and a non-specific broadcast transmission packet is defined as the broadcast transmission packet without the information indicating the shooting instruction at the data link level,
   wherein the processor is configured to
      control the communication device to consecutively transmit a plurality of specific broadcast transmission packets in a state in which a communication connection between the shooting instruction terminal and the shooting terminal is not established,
      control the communication device to transmit the non-specific broadcast transmission packet after controlling the communication device to consecutively transmit the plurality of specific broadcast transmission packets in the state in which the communication connection between the shooting instruction terminal and the shooting terminal is not established,
      determine that among the shooting terminals that transmit a scan request packet or a communication connect request packet received by the communication device after the specific broadcast transmission packet is transmitted by the communication device for the first time, only the shooting terminals that transmit the scan request packet or the communication connect request packet received by the communication device after the non-specific broadcast transmission packet is transmitted by the communication device are successful in shooting in response to the shooting instruction, and
      notify a user at the user notification unit with at least one of information of the shooting terminals being successful in shooting in response to the shooting instruction and information of the shooting terminals failed in shooting in response to the shooting instruction according to the determination results.

* * * * *